(12) United States Patent  (10) Patent No.: US 9,307,287 B2
Bartel-Kurz et al.  (45) Date of Patent: Apr. 5, 2016

(54) TRANSPORT-STREAM PROVIDER, DAB SIGNAL PROVIDER, TRANSPORT STREAM ANALYZER, DAB RECEIVER, METHOD, COMPUTER PROGRAM, AND TRANSPORT STREAM SIGNAL

(71) Applicant: Fraunhofer-Gesellschaft zur Foerderung der angewandten Forschung e.V., Munich (DE)

(72) Inventors: Birgit Bartel-Kurz, Erlangen (DE); Stefan Doehla, Erlangen (DE); Markus Prosch, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 74 days.

(21) Appl. No.: 13/679,450

(22) Filed: Nov. 16, 2012

(65) Prior Publication Data

US 2013/0152121 A1  Jun. 13, 2013

Related U.S. Application Data

(63) Continuation of application No. PCT/EP2011/057975, filed on May 17, 2011.

(30) Foreign Application Priority Data

May 19, 2010 (DE) .......................... 10 2010 029 114
Feb. 8, 2011 (EP) ...................................... 11153693

(51) Int. Cl.
*H04N 21/236* (2011.01)
*H04N 21/4405* (2011.01)
(Continued)

(52) U.S. Cl.
CPC ........... *H04N 21/4405* (2013.01); *H04H 60/15* (2013.01); *H04N 21/236* (2013.01);
(Continued)

(58) Field of Classification Search
CPC ................... H04N 21/2362; H04N 21/26606; H04N 21/236; H04N 21/266
See application file for complete search history.

(56) References Cited

U.S. PATENT DOCUMENTS 6,215,530 B1 * 4/2001 Wasilewski .......... H04N 5/4401
                                                      348/387.1
6,487,720 B1 * 11/2002 Ohishi .................. H04H 40/18
                                                      348/E7.063
(Continued)

FOREIGN PATENT DOCUMENTS

CN  101188750 A  5/2008
CN  101217650 A  7/2008
(Continued)

OTHER PUBLICATIONS

"Digital Audio Broadcasting (DAB); Conditional Access", ETSI TS 102 367 V1.2.1, Jan. 2006, 1-38.
(Continued)

*Primary Examiner* — Robert Hance
(74) *Attorney, Agent, or Firm* — Michael A. Glenn; Perkins Coie LLP

(57) ABSTRACT

A transport stream provider for providing a plurality of transport stream packets describing digital media information is configured to provide a transport stream packet of a first packet type including a program association table and key information for decrypting encrypted media information. The program association table contains an association between a program No. and a packet type identifier of a further transport stream packet of a second packet type. The transport stream provider is configured to provide a transport stream packet of the second packet type in such a manner that the transport stream packet of the second packet type contains a reference to packet type identifiers of transport stream payload data packets which describe contents of different content types of the digital media information.

14 Claims, 16 Drawing Sheets

(51) Int. Cl.
  *H04N 21/2362* (2011.01)
  *H04N 21/266* (2011.01)
  *H04H 60/15* (2008.01)
  *H04N 21/647* (2011.01)
  *H04N 21/438* (2011.01)
  *H04N 21/4385* (2011.01)
  *H04N 21/442* (2011.01)
  *H04N 21/4627* (2011.01)
  *H04N 21/8352* (2011.01)

(52) U.S. Cl.
  CPC ......... *H04N21/2362* (2013.01); *H04N 21/266* (2013.01); *H04N 21/26606* (2013.01); *H04N 21/4381* (2013.01); *H04N 21/43853* (2013.01); *H04N 21/442* (2013.01); *H04N 21/4627* (2013.01); *H04N 21/647* (2013.01); *H04N 21/8352* (2013.01)

(56) References Cited

U.S. PATENT DOCUMENTS

| | | | | |
|---|---|---|---|---|
| 7,113,523 | B1* | 9/2006 | Kubota | H04L 63/0428 348/729 |
| 2002/0090087 | A1* | 7/2002 | Tamura | H04N 7/165 380/210 |
| 2005/0226415 | A1* | 10/2005 | Kubota | H04N 7/24 380/210 |
| 2005/0226417 | A1* | 10/2005 | Kubota | H04N 7/1675 380/228 |

FOREIGN PATENT DOCUMENTS

| | | |
|---|---|---|
| CN | 101360226 A | 2/2009 |
| EP | 1022900 A1 | 7/2000 |
| JP | H11122553 A | 4/1999 |
| JP | 2005160040 A | 6/2005 |
| KR | 10-2008-0058382 | 6/2008 |
| WO | WO-00/03541 A1 | 1/2000 |
| WO | WO-2007/033238 A2 | 3/2007 |

OTHER PUBLICATIONS

"Digital Audio Broadcasting (DAB); DMB Video Service; User Application Specification", ETSI TS 102 428 V1.1.1., Jun. 2005, 1-30.

"Digital Audio Broadcasting (DAB); DMB Video Service; User Application Specification", European Broadcasting Union. ETSI TS 102 428 V1.2.1., Apr. 2009, 1-31.

"Digital Video Broadcasting (DVB); Support for Use of Scrambling and Conditional Access (CA) Within Digital Broadcasting Systems", ETSI ETR 289., Oct. 1996, 1-13.

"Radio Broadcasting Systems; Digital Audio Broadcasting (DAB) to Mobile, Portable and Fixed Receivers", ETSI EN 300 401 V1.4.1., Jun. 2006, 1-197.

"Series H: Audiovisual and Multimedia Systems: Infrastructure of Audiovisual Services—Transmission Multiplexing and Synchronization", Information Technology—Generic Coding of Moving Pictures and Associated Audio Information: Systems. ITU-T (International Telecommunication Union). H.222.0., May 2006, 1-190.

\* cited by examiner structure of a TS packet (generally)

| syntax | number of bits | restrictions |
|---|---|---|
| Transport_packet(){ | | |
| sync_byte | 8 | "00" |
| transport_error_indicator | 1 | |
| payload_unit_start_indicator | 1 | |
| transport_priority | 1 | |
| PID | 13 | |
| transport_scrambling_control | 2 | |
| adaptation_filed_control | 2 | |
| continuity_counter | 4 | |
| if(adaptation_field_control=='10'\|\|adaptation_field_control=='11'){ | | |
|    adaptation_field() | | |
| } | | |
| if(adaptation_field_control=='01'\|\|adaptation_field_control=='11'){ | | |
|    for(i=0; <N; i++){ | | |
|       Data_byte | 8 | |
|    } | | |
| } | | |
| } | | |

(first 4 rows form a 4 byte prefix)

FIGURE 8A structure of the adaptation field of a TS packet (generally)

| syntax | number of bits | restrictions |
|---|---|---|
| adaptation_field(){ | | |
|    adaptation_field_length | 8 | |
|    if (adaptation_field_lengh>0){ | | |
|       Discontinuity_indicator | 1 | |
|       random_access_indicator | 1 | |
|       elementry_stream_priority_indicator | 1 | |
|       PCR_flag | 1 | |
|       OPCR_flag | 1 | "0" |
|       splicing_point_flag | 1 | |
|       transport_private_data_flag | 1 | |
|       adaptation_field_extension_flag | 1 | "0" |
|       if (PCR_flag=='1'){ | | |
|          program_clock_reference_base | 33 | |
|          Reserved | 6 | |
|          program_clock_reference_extension | 9 | |
|       } | | |
|       if (OPCR_flag=='1'){ | | unused |
|       } | | |
|       if (splicing_point_flag=='1'){ | | |
|          splice_countdawn | 8 | |
|       } | | |
|       if (transport_private_data_flag=='1'){ | | |
|          transport_private_data_length | 8 | |
|          for (i=0; i<transport_private_data_length; i++){ | | |
|             Private_data_byte | 8 | |
|          } | | |
|       } | | |
|       if (adaptation_field_extension_flag=='1'){ | | unused |
|       } | | |
|       for (i=0; i<N; i++){ | | |
|          stuffing_byte | 8 | |
|       } | | |
|    } | | |
| } | | |

FIGURE 8B

| syntax | number of bits | Mnemonic |
|---|---|---|
| CA_section(){ | | |
|    table_id | 8 | uimsbf |
|    section_syntax_indicator | 1 | bslbf |
|    '0' | 1 | bslbf |
|    reserved | 2 | bslbf |
|    section_length | 12 | uimsbf |
|    reserved | 18 | bslbf |
|    version_number | 5 | uimsbf |
|    current_next_indicator | 1 | bslbf |
|    section_number | 8 | uimsbf |
|    last_section_number | 8 | uimsbf |
|    for(i=0; i<N; i++){ | | |
|       descriptor() | | |
|    } | | |
|    CRC_32 | 32 | rpchof |
| } | | |

FIGURE 9A

| syntax | number of bits | Mnemonic |
|---|---|---|
| CA_descriptor(){ | | |
|    descriptor_tag | 8 | uimsbf |
|    descriptor_length | 8 | uimsbf |
|    CA_system_ID | 16 | uimsbf |
|    reserved | 3 | bslbf |
|    CA_PID | 13 | uimsbf |
|    for(i=0; i<N; i++){ | | |
|       private_data_byte | 8 | uimsbf |
|    } | | |
| } | | |

FIGURE 9B

| syntax | number of bits | Mnemonic |
|---|---|---|
| CA_ECM_section(){ | | |
| table_id | 8 | uimsbf |
| section_syntax_indicator | 1 | bslbf |
| '0' | 1 | bslbf |
| <u>reserved</u> | <u>2</u> | <u>bslbf</u> |
| section_length | 12 | uimsbf |
| reserved | 18 | bslbf |
| version_number | 5 | uimsbf |
| current_next_indicator | 1 | bslbf |
| section_number | 8 | uimsbf |
| last_section_number | 8 | uimsbf |
| for(i=0; i<N; i++){ | | |
|    descriptor() | | |
| } | | |
| CRC_32 | 32 | rpchof |
| } | | |

FIGURE 10

| syntax | number of bits | Mnemonic |
|---|---|---|
| CA_data(){ | | |
|    table_id | 8 | uimsbf |
|    reserved | 3 | bslbf |
|    CA_PID | 13 | uimsbf |
|    CA_info_length | 8 | uimsbf |
|    proprietary_CA_Information(); | | |
|    CRC_32 | 32 | rpchof |
| } | | |

FIGURE 11

| bit values | description |
|---|---|
| 00 | no encryption of the payload of the MPEG TS packet |
| 01 | reserved |
| 10 | TS packet encrypted with even-numbered key |
| 11 | TS packet encrypted with odd-numbered key |

FIGURE 12

1300 program association section

| syntax | number of bits | Mnemonic |
|---|---|---|
| program_association_section(){ | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N; i++){ | | |
|         program_number | 16 | uimsbf |
|         reserved | 3 | bslbf |
|         if (program_number=='0'){ | | |
|             network_PID | 13 | uimsbf |
|         } | | |
|         else { | | |
|             program_map_PID | 13 | uimsbf |
|         } | | |
|     } | | |
|     CRC_32 | 32 | rpchof |
| } | | |

FIGURE 13

TRANSPORT-STREAM PROVIDER, DAB SIGNAL PROVIDER, TRANSPORT STREAM ANALYZER, DAB RECEIVER, METHOD, COMPUTER PROGRAM, AND TRANSPORT STREAM SIGNAL

CROSS-REFERENCE TO RELATED APPLICATIONS

This application is a continuation of copending International Application No. PCT/EP2011/057975, filed May 17, 2011, which is incorporated herein by reference in its entirety, and additionally claims priority from German Application No. 102010029114.5, filed May 19, 2010, and European Application No. 11153693.4, filed Feb. 8, 2011, both of which are incorporated herein by reference in their entirety.

Embodiments in accordance with the invention relate to a transport stream provider for providing a plurality of transport stream packets that describe digital media information. Further embodiments in accordance with the invention relate to a DAB signal provider. Further embodiments in accordance with the invention relate to a transport stream analyzer for providing access restriction information for decrypting access-restricted digital media information on the basis of a transport stream. Further embodiments in accordance with the invention relate to a DAB receiver. Further embodiments in accordance with the invention relate to corresponding methods and corresponding computer programs. Further embodiments in accordance with the invention relate to a transport stream signal. Further embodiments in accordance with the invention relate to a basic framework for conditional access to digital multimedia broadcasting (DMB) for bit-rate-saving transport of information relating to the conditional access.

BACKGROUND OF THE INVENTION

Digital multimedia broadcasting, known under the abbreviation of DMB, is an extension of previous digital audio broadcasting, known under the abbreviation of DAB, by audio-visual contents. Digital multimedia broadcasting, DMB, "inherits" full DAB functionality, but is supplemented by the possibility of additionally transmitting MPEG2-encoded transport streams comprising video contents and/or audio contents.

At the transmitting end, the existing DAB multiplexer is supplemented, for this purpose, by a DMB gateway accepting the MPEG2 transport stream from a DMB encoder.

FIG. 14 shows a schematic representation of DMB signal processing. DMB signal processing 1400 of FIG. 14 receives multimedia information 1410 including, e.g., an audio signal and/or a video signal. DMB signal processing 1400 further includes a DMB encoder 1420 configured to create an MPEG2 transport stream 1422 on the basis of the multimedia information 1410. Signal processing 1400 further includes a DMB gateway 1430 configured to receive the MPEG2 transport stream 1422 and to create a DAB subchannel 1432 on the basis thereof. Signal processing 1400 further includes a DAB multiplexer 1440 configured to add the DAB subchannel 1432 to a DAB signal which combines, for example, a plurality of DAB subchannels. Thus, a DAB multiplex signal is obtained, for example.

For details of how a signal conforming to DMB, or a DAB signal including DMB information, may be obtained please refer to the corresponding publications of the European Broadcasting Union (EBU), for example. Details are given, for example, in the publication ETSI TS 102 428, VI.2.1 entitled "Digital Audio Broadcasting (DAB); DMB video services; User application specification" and in the documents referred to therein.

Digital multimedia broadcasting, DMB, is a technology by means of which "television" on mobile receivers is to be enabled. Thus, DMB represents an alternative to technologies such as DVB-H, for example.

One application of interest is pay TV, wherein contents are transmitted in a protected (encrypted) manner and are available to entitled users only. This concept will be referred to as access restriction below. Encryption of the contents and provision of useful additional messages is performed by a system for conditional access, which is sometimes also referred to as a "Conditional Access System", or "CA" for short. For example, the additional messages are entitlement messages (also referred to as "EMM") or messages containing the current content key (also referred to as ECM). Entitlement messages are sometimes also referred to as entitlement management messages EMM. Messages containing a current content key are sometimes also referred to as entitlement control messages ECM. The additional messages will be referred to as CA information for short in the following and are also transmitted via the broadcasting channel. One goal is to keep the overhead, which results from the CA information (information on conditional access) being sent out, to a minimum.

Against this background, it is the object of the present invention to provide a concept which enables efficiently transmitting access-restricted media information (at a low consumption of resources).

SUMMARY

One embodiment may have a transport stream provider for providing a plurality of transport stream packets describing digital media information, the transport stream provider being configured to provide a transport stream packet of a first packet type having a program association table and access restriction information having key information for decrypting encrypted media information, the program association table having an association between a program No. and a packet type identifier of a further transport stream packet of a second packet type; and the transport stream provider being configured to provide a transport stream packet of the second packet type such that the transport stream packet of the second packet type includes a reference to packet type identifiers of transport stream payload data packets which describe contents of different content types of the digital media information.

According to another embodiment, a DAB signal provider for providing a DAB signal including access-restricted media information may have: a transport stream provider as claimed in any of claims 1 to 10, configured to provide transport stream packets of a first packet type which have a program association table and access restriction information, and to provide a transport stream packet of the second packet type in such a manner that the transport stream packet of the second packet type includes a reference to packet type identifiers of transport stream payload data packets, and to provide transport stream payload data packets of a third packet type which describe a content of a first media type of the access-restricted media information, and to provide transport stream payload data packets of a fourth packet type which describe a content of a second media type of the access-restricted media information, a content of at least some of the transport stream payload data packets of the third packet type being encrypted, or a content of at least some of the transport stream payload data packets of the fourth packet type being encrypted, the transport stream packets of the first packet type, the transport stream packets of the second packet type, the transport stream packets of the third packet type, and the transport stream packets of the fourth packet type being part of an MPEG2 transport stream, and the access restriction information contained within the transport stream packets of the first packet type having content key information for decrypting the encrypted contents of the transport stream packets of the third packet type or the encrypted contents of the transport stream packets of the fourth packet type; and a DAB services combiner configured to combine the MPEG2 transport stream with one or more other DAB services so as to acquire the DAB signal.

According to another embodiment, a transport stream analyzer for providing access restriction information for decrypting access-restricted digital media information on the basis of a transport stream may have: a packet type identifier configured to identify a packet of a predefined first packet type, which has a predefined first packet type identifier and has a program association table, as an identified packet; and a packet analyzer configured to search the identified packet for access restriction information and to provide any access restriction information found therein.

According to another embodiment, a DAB receiver may have: a DAB services separator configured to extract an MPEG2 transport stream from a DAB signal which have one or more further DAB services in addition to the MPEG2 transport stream; and a transport stream analyzer as described herein, configured to receive the MPEG2 transport stream from the DAB services separator and to provide the access restriction information for decrypting access-restricted digital media information on the basis of the transport stream; and a content decrypter configured to decrypt encrypted media contents of the access-restricted digital media information while using the access restriction information.

According to another embodiment, a method of providing a plurality of transport stream packets describing digital media information may have the steps of: providing a transport stream packet of a first packet type having a program association table and access restriction information having key information for decrypting encrypted media information, the program association table having an association between a program No. and a packet type identifier of a further transport stream packet of a second packet type; and providing a transport stream packet of the second packet type such that the transport stream packet of the second packet type has a reference to packet type identifiers of transport stream payload data packets which describe contents of different content types of the digital media information.

According to another embodiment, a method of providing access restriction information for decrypting access-restricted digital media information on the basis of a transport stream may have the steps of: identifying a transport stream packet of a predefined first packet type, which has a predefined first packet type identifier and has a program association table, as an identified packet; searching the identified packet for access restriction information; and providing access restriction information found within the identified packet.

Another embodiment may have a computer program for performing any of the methods as described above, when the computer program runs on a computer.

According to another embodiment, a transport stream signal may have: a transport stream packet of a first packet type having a program association table and access restriction information having key information for decrypting encrypted media information, the program association table having an association between a program No. and a packet type identifier of a further transport stream packet of a second packet type; and a transport stream packet of the second packet type, the transport stream packet of the second packet type having a reference to packet type identifiers of transport stream payload data packets which describe contents of different content types of the digital media information.

It is a core idea of the present invention that access restriction information (CA information), which includes key information for decrypting encrypted media information, may be embedded, in a resource-efficient manner, into transport stream packets comprising a program association table. For example, one has found out that transport stream packets (e.g. with DMB) have free bit capacities in the program association table on a regular basis. With DMB, for example, this is an SPTS (single program transport stream) and, therefore, it is only precisely one program that is contained within the data stream. In this manner, embedding of the access restriction information may be effected without introducing any additional information in the transport stream payload data packets or using additional transport stream packets. For example, an amount of data which is to be transmitted, overall, within the transport stream packets of the first packet type which have the program association tables is typically clearly smaller than the amount of data to be transmitted by transport stream payload data packets. Moreover, the transport stream payload data packets are typically filled entirely with payload data on a regular basis (or frequently) already without the use of an access restriction mechanism. This is due to the fact that a payload data encoder (e.g. an audio encoder or a video encoder) typically operates irrespective of whether the encoded audio data or video data is provided with an access restriction mechanism. Such an audio encoder and/or video encoder will therefore typically try to exploit the entire data capacity of the transport stream payload data packets so as to achieve optimum audio quality and/or video quality.

It has thus been found out that introducing the access restriction information into the transport stream payload data packets or utilization of additional transport stream packets would result in that an audio encoder and/or video encoder would not be allowed to exploit either the full data rate, which is transmissible by the transport stream payload data packets, so as to leave space within the transport stream payload data packets, or in that the transport stream payload data packets would have to be repacked if the access restriction information were to be embedded into transport stream payload data packets filled entirely with payload data. On the other hand, one has found out that the transport stream packets of the first packet type, which contain the program association table, comprise free data capacities in a reliable and/or regular manner in a very large number of applications, said free data capacities being exploited by said embedding of the access restriction information.

In addition, one has found out that embedding the access restriction information into the transport stream packets of the first packet type enables particularly fast access to the encrypted media information, since it can thus be achieved that the access restriction information is already available immediately following the evaluation of the transport stream packet of the first packet type. However, evaluation of the transport stream packet of the first packet type, in particular of the program association table contained therein, is absolutely vital anyway so as to be able to evaluate and/or reproduce digital media information. In this respect, the inventive concept enables providing an access restriction mechanism which dispenses with any noticeable additional delays in the reproduction of the digital media information.

In an advantageous embodiment, transport stream packets of the different packet types, that is, in particular, the transport stream packets of the first packet type and of the second packet type as well as the transport stream payload data packets, have identical packet lengths. This facilitates transmission of the transport stream packets in some networks. As the same time, this characteristic ensures that comparatively large amounts of data may be embedded within the transport stream packets of the first packet type, in addition to the program association table. In particular, this enables embedding the access restriction information in addition to the program association table.

In an advantageous embodiment, the transport stream provider is configured to add the access restriction information in an additional information field of the transport stream packet of the first packet type and to signal by a flag a presence of the additional information field. Embedding the access restriction information into an additional information field of the transport stream packet of the first packet type enables the transport stream packet of the first packet type to conform to the current standards despite the addition of the access restriction information, said current standards making no provisions with regard to the data contents embedded in the additional information field. In particular, the inventive concept allows using access restriction information without violating any existing standards while obtaining a functionality which is improved as compared to the standard systems. Thus, the inventive concept allows utilizing the access restriction mechanism as early as at the transport stream level, it being possible to add the access restriction mechanism with little effort to digital media information which is already encoded and packed.

In an advantageous embodiment, the transport stream provider is configured to provide the transport stream packets such that each of the transport stream packets comprises, at a predefined position of a transport stream packet preamble, a packet type identifier which identifies a packet type. The transport stream provider is configured to provide the transport stream packets such that a transport stream packet having the program association table and the access restriction information comprises a reference to a packet type identifier of a further transport stream packet having a program mapping table including packet type identifiers for one or more types of data streams, without the transport stream packet having the program association table and the access restriction information itself describing the payload content of the digital media information. In this respect, a hierarchical separation between transport stream packets containing management information (e.g. the program association table and the access restriction information) and transport stream packets describing the payload content of the digital media information (i.e., encoded audio information and/or encoded image information and/or encoded video information) may be achieved. Thus, embedding of the access restriction information is independent of the payload content of the digital media information.

In an advantageous embodiment, the transport stream provider is configured to provide the transport stream packet having the program association table and the access restriction information in such a manner that the corresponding transport stream packet of the first packet type comprises a sequence of sections of different access restriction information. In this context, one of the sections advantageously comprises an entitlement management message (an EMM message, for example) or a reference to an entitlement management message, and another one of the section comprises an entitlement key message (an ECM message, for example) or a reference to an entitlement key message. The sections of the access restriction information each have a table identifier describing the type of access restriction information contained within the section. Moreover, the sections of the access restriction information also comprise length information describing a length of the information contained within the section.

On account of the corresponding concept it is possible to embed different types of access restriction information in one single transport stream packet in a structured manner. In particular, performing said embedding in a section-by-section manner enables, on the decoder side, effective access to the information that may actually be used, since it is possible on the decoder side to simply skip, in the evaluation, any sections whose information content is not needed. This is enabled, in particular, by the length identifier. In addition, the described manner of embedding the access restriction information, which may be performed in an additional information field, for example, may also add further information, which is not related to the access restriction, to the corresponding transport stream packet.

Moreover, it is optionally possible for cross references to exist between individual ones of the sections having different access restriction information. For example, one may differentiate between sections having cross references and sections having the actual access restriction data. This enables hierarchically structuring even the access restriction information and/or replicating, within the additional information field, references between transport stream packets of different packet types.

In an advantageous embodiment, the transport stream provider is configured to provide the transport stream such that the transport stream includes a reference to a separate channel in which entitlement management messages (e.g. EMM messages) are transmitted. This concept is advantageous when the data volume of the entitlement management messages is very large and/or when the entitlement management messages contain information which is significant to several multimedia programs.

One embodiment in accordance with the invention provides a DAB signal provider for providing a DAB signal including access-restricted media information. The DAB signal provider includes a transport stream provider as was described above. The transport stream provider here is advantageously configured to provide transport stream packets of a first packet type which include a program association table and access restriction information. The transport stream provider is further configured to provide transport stream packets of a second packet type such that the transport stream packets of the second packet type contain references to packet type identifiers of transport stream payload data packets which describe contents of different content types of the digital media information. The transport stream provider is further configured to provide transport stream packets of further packet types (for example of a third packet type and of a fourth packet type as well as possibly additional packet types), each of which describes the content of a media type (for example encoded audio data or video data) of the access-restricted media information. For example, the third packet type and the fourth packet type may describe contents of different media types of the access-restricted media information. In this context, contents of at least some of the transport stream packets of the further packet types are encrypted.

The transport stream packets of the first packet type, of the second packet type and of the further packet types are part of an MPEG2 transport stream. The access restriction information contained within the transport stream packets of the first packet type include key information for decrypting the encrypted contents of the transport stream packets of the further packet types.

In one embodiment, there are the four packet types of PAT (program association table), PMT (program mapping table), audio, and video. However, in practice, there may additionally exist other types, e.g., descriptors and scene.

The DAB signal provider further includes a DAB services combiner configured to combine the MPEG2 transport stream with one or more other DAB services so as to obtain the DAB signal. The DAB signal provider allows broadcasting DAB services together with multimedia information, said multimedia information, which is added to the other DAB services, being encrypted at the level of transport stream packets. This allows handling the access restriction to the multimedia contents independently of any access restrictions to the remaining DAB services. Since the access restriction takes place as early as at the level of the transport stream packets, any mechanisms for error protection which are employed in combining the DAB services are unrestrictedly effective with regard to the access-protected multimedia information and the associated key information, so that a high level of reliability in data transmission is provided here.

Moreover, in accordance with the concept of the invention, it is possible to add access restriction information without changing the DAB protocol.

In addition, by means of the inventive concept, the available data rate may be exploited in an almost ideal manner since the access restriction information (including the key information) is not embedded in the transport stream payload data packets (i.e., in the transport stream packets of the further packet types, e.g., of the third packet type and/or of the fourth packet type) but is embedded in the transport stream packets of the first packet type which contain the program association table. Said packets of the first packet type typically still have sufficient space (in terms of bits) available even in the event of full exploitation of the transport stream payload data packets by the multimedia data. This means that the concept mentioned enables realizing an access restriction mechanism which, on the one hand, meets the requirements of the relevant standards and, on the other hand, is independent of the instantaneous bit rate requirement of the access-restricted multimedia information.

An embodiment in accordance with the invention provides a transport stream analyzer for providing access restriction information for decrypting access-restricted digital media information on the basis of a transport stream. The transport stream analyzer includes a packet type identifier configured to identify a packet of a predefined first packet type—which comprises a predefined first packet type identifier and contains a program association table—as an identified packet. The transport stream analyzer further includes a packet analyzer configured to search the identified packet for access restriction information and to provide any access restriction information found. The corresponding transport stream analyzer is based on the finding that a transport stream packet containing a program association table is particularly well suited for embedding access restriction information, as was already explained in detail above. Therefore, the packet type identifier is configured to identify precisely such transport stream packets and to extract the access restriction information from them.

In an advantageous embodiment, the transport stream analyzer is configured to evaluate the program association table within the transport stream packet of the predefined first packet type and to determine, on the basis of the program association table, a second packet type identifier associated with a transport stream packet having a program mapping table. The transport stream analyzer further includes a packet type association determiner configured to identify, on the basis of the determined second packet type identifier, a transport stream packet having a program mapping table within the transport stream and to evaluate the program mapping table so as to obtain information about which packet type identifiers are associated with transport stream payload data packets containing media contents of the access-restricted digital media information. Thus, the transport stream analyzer implements a hierarchical concept wherein only management information is extracted from transport stream packets of the first packet type and of the second packet type, whereas suitable payload data is extracted from transport stream payload data packets of other packet types (e.g. of a third packet type and of a fourth packet type, which differ from the first and second packet types).

In an advantageous embodiment, the transport stream analyzer further includes a decrypter configured to decrypt encrypted media contents, contained within transport stream payload data packets comprising packet type identifiers described in the program mapping table, while using the access restriction information contained within the transport stream packet of the predefined first packet type.

In a further advantageous embodiment, the packet analyzer is configured to check the identified packet of the predefined first packet type for whether an additional information field comprises one or more tables characterized by predefined table identifiers and containing access restriction information. The packet analyzer is further configured to provide the access restriction information contained within identified tables. Thus, an additional information field (e.g. a private data field) is evaluated by the packet analyzer, which enables evaluating—without violating any existing standards—access restriction information which may be used more efficiently than any known access restriction information.

In an advantageous embodiment, the packet analyzer is configured to verify—in response to finding a first table characterized by a first predefined table identifier and containing access restriction information, and in dependence on table length information contained within the first table—whether the additional information field of the identified packet of the predefined first packet type contains, subsequently to the first table, a further table containing access restriction information, and to provide the access restriction information contained within the further table. Utilization of several independent tables within one single additional information field, and corresponding evaluation of said tables enable flexibly reacting, on the decoder side, to the access restriction information that is contained within the respective transport stream packet of the first packet type, or to the amount of access restriction information that is transmitted within the transport stream packet of the first packet type.

An embodiment in accordance with the invention provides a DAB receiver comprising a DAB services separator configured to extract an MPEG2 transport stream from a DAB signal including one or more further DAB services in addition to the MPEG2 transport stream. The DAB receiver further includes a transport stream analyzer as was explained above. The transport stream analyzer is configured to receive the MPEG2 transport stream from the services separator and to provide the access restriction information for decrypting access-restricted digital media information on the basis of the transport stream. The DAB receiver further includes a content decrypter configured to decrypt encrypted media contents of the access-restricted digital media information while using the access restriction information. The corresponding DAB receiver essentially entails the same advantages as were already described with regard to the DAB signal provider.

Embodiments in accordance with the present invention additionally provide corresponding methods and corresponding computer programs.

Further embodiments in accordance with the present invention additionally provide a corresponding transport stream signal which includes the above-described transport stream packets and thus entails the advantages explained above.

BRIEF DESCRIPTION OF THE DRAWINGS

Embodiments in accordance with the present invention will be explained in more detail below with reference to the accompanying figures, wherein:

FIG. 8A shows a syntax description of a transport stream packet in accordance with ISO/IEC 13818-1;

FIG. 8B shows a syntax description of an adaptation field of a transport stream packet in accordance with ISO/IEC 13818-1 while taking into account the restrictions in accordance with ETSI TS 102 428 V1.2.1;

FIG. 9A shows a syntax description of a table comprising access restriction information in accordance with ISO/IEC 13818-1;

FIG. 9B shows a syntax description of descriptors for utilization in a table of FIG. 9A in accordance with ISO/IEC 13818-1;

FIG. 10 shows a syntax description of a further table for access restriction information;

FIG. 11 shows a syntax description of a further table for access restriction information;

FIG. 12 shows a tabular representation of possible bit combinations for describing an access restriction status;

FIG. 13 shows a syntax description of a program association section in accordance with ISO-IEC 13818;

DETAILED DESCRIPTION OF THE INVENTION

The basic structures of the inventive transport stream provider, of the inventive DAB signal provider, of the inventive transport stream analyzer, and of the inventive DAB receiver will initially be described below with reference to FIGS. 1 to 4. Subsequently, the transport stream, which is provided and/or evaluated in accordance with the invention, will be described in detail with reference to FIGS. 5A to 13. Subsequently, further concepts for realizing access restriction which serve as comparative examples will be described with reference to FIGS. 15 and 16.

1. TRANSPORT STREAM PROVIDER OF FIG. 1

Figure 1:
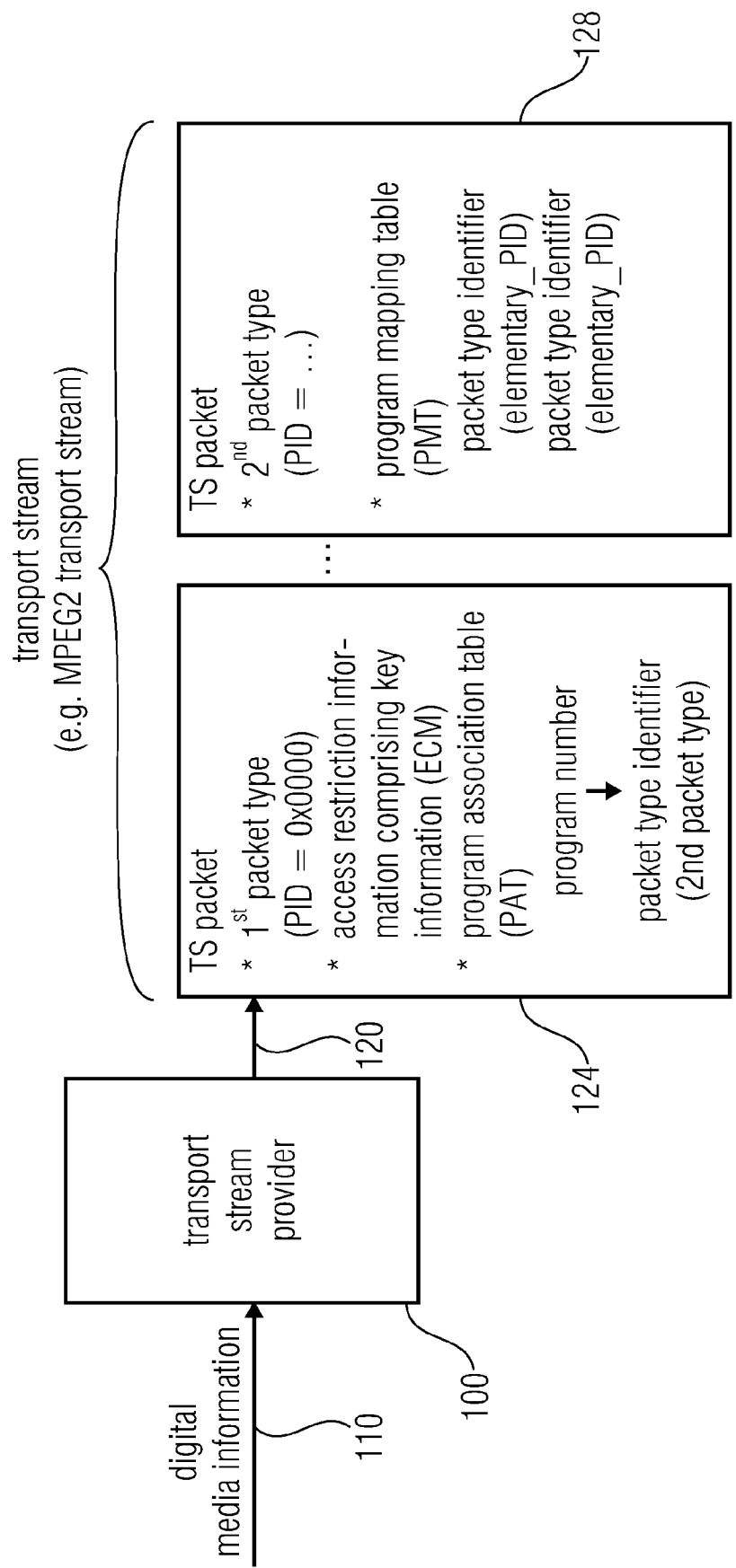
FIG. 1 shows a block diagram of a transport stream provider in accordance with an embodiment of the present invention.

FIG. 1 shows a block diagram of a transport stream provider 100 for providing a plurality of transport stream packets describing digital media information (advantageously digital multimedia information comprising several media types). The transport stream provider 100 is configured to receive the digital media information 110 and to provide a transport stream 120 on the basis thereof. The transport stream provider 100 is configured to provide a first transport stream packet 124 of a first packet type comprising a program association table (PAT) and access restriction information comprising key information (ECM) for decrypting encrypted media information. The program association table (PAT) includes (or describes) an association between a program number and a packet type identifier of a further transport packet of a second packet type. The first transport stream packet 124 may include a first packet type identifier PID, for example, which signals the first packet type. The transport stream provider 100 is further configured to provide a second transport stream packet 128, which comprises the second packet type, such that the transport stream packet 128 of the second packet type contains a reference to packet type identifiers of transport stream payload data packets which describe contents of different content types of the digital media information. Thus, the transport stream packet 128 may include, e.g. in a program mapping table, a plurality of packet type identifiers, it being possible for the program mapping table or for information referenced therein to further define the media type with which transport stream packets having a specific packet type identifier are associated. The transport stream packet 128 of the second packet type may itself be characterized by a corresponding packet type identifier indicated in the transport stream packet of the first packet type.

Further details as to what exactly the transport stream may look like will be explained in more detail in the following.

2. DAB SIGNAL PROVIDER OF FIGS. 2A AND 2B 2.1. DAB Signal Provider of FIG. 2A An inventive framework for access restriction for digital multimedia broadcasting, DMB, will be described below with reference to FIG. 2A. Said access restriction is sometimes also referred to as conditional access (CA). The various aspects of this concept will be described below, and a method description will be provided, in particular.

2.1.1 Encryption Level

One aspect of the inventive concept consists in selecting a suitable encryption level. In embodiments in accordance with the invention, encryption takes place at the MPEG2 transport stream level. This means that the entire payload of an MPEG2 transport stream packet is encrypted if need be. The MPEG2 transport stream message header remains unencrypted and indicates whether the MPEG2 transport stream packet is encrypted. In addition, the MPEG2 transport stream message header in this case (i.e., if the MPEG2 transport stream packet is encrypted) also indicates which key (from a plurality of keys, referred to as "even-numbered key" or "odd-numbered key", for example) may be used for decryption. The actual encryption as well as the signaling whether encryption takes place and which key ("odd-numbered" or "even-numbered") is possibly used takes place in a manner that is analogous to digital video broadcasting, DVB.

Figure 2A:
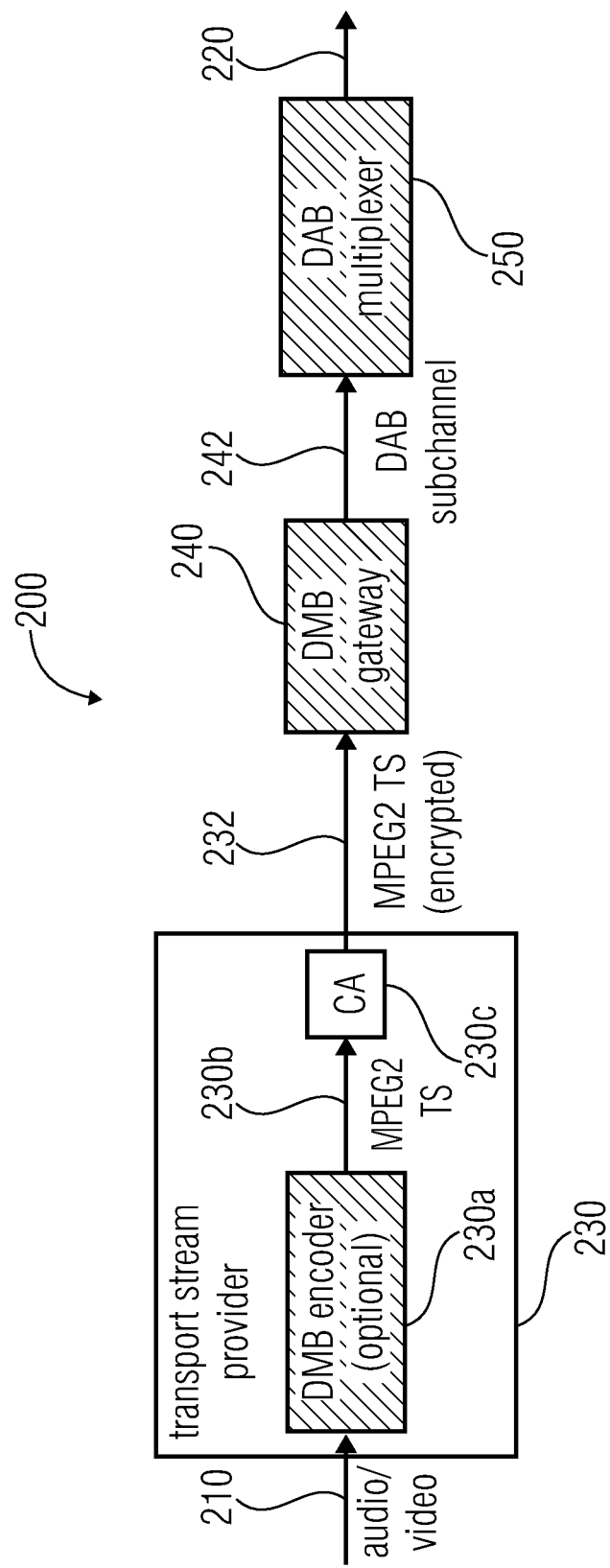
FIGS. 2A and 2B show block diagrams of DAB signal providers in accordance with embodiments of the present invention.

FIG. 2A shows a block diagram of a DAB signal provider 200 configured to receive digital media information 210 and to provide a DAB signal 220 on the basis thereof. Said digital media information 210 may advantageously be multimedia information including information on several media types (e.g. audio information and image information or audio information and video information). The DAB signal provider includes a transport stream provider 230 configured to provide, on the basis of the digital media information 210, an MPEG2 transport stream 232 which is at least partly encrypted.

The transport stream provider 230 optionally includes a DMB encoder 230a configured to provide, on the basis of the digital media information 210, an MPEG2 transport stream 230b which represents the digital media information 210 in a transport stream format corresponding, e.g., to the ETSI TS 102 428 V1.2.1 specifications. The transport stream provider 230 further includes an access restriction adder 230c configured to receive the MPEG2 transport stream 230b and to create, on the basis thereof, the at least partly encrypted MPEG2 transport stream 232. The access restriction adder is configured to encrypt, on the one hand, some of the MPEG2 transport stream 230b, for example some or all of the transport stream payload data packets of the MPEG2 transport stream 230b, and, on the other hand, to add to the MPEG2 transport stream 230b access restriction information which enables a decoder which is aware of a corresponding secret to decrypt the encrypted information of the MPEG2 transport stream 232.

However, it shall be noted here that the functionality of the DMB encoder 230a may also be realized outside the transport stream provider 230, so that the DMB encoder 230a in this case will not be part of the transport stream provider 230. Moreover, the functionalities of the DMB encoder 230a and of the access restriction adder 230c may also be combined. The decisive point essentially is that the transport stream provider 230 supplies an MPEG2 transport stream 232 as was briefly explained with reference to FIG. 1 and will be explained in detail below.

The DAB signal provider 200 further includes a so called DMB gateway 240 configured to receive the MPEG2 transport stream 232 and to provide a DAB subchannel signal 242 on the basis thereof. The DAB signal provider 200 further includes a DAB multiplexer 250 configured to receive the DAB subchannel signal 242 and to provide, on the basis thereof, a DAB signal 220 reproducing and/or describing a plurality of DAB services in a multiplexing mode.

2.1.2 Transporting the Access Restriction Information (CA Information)

The information concerning the access restriction (also referred to as CA information), i.e., the indication of the encryption method used, and the entitlement control message (here ECM) are transmitted in a different manner than with DVB. While digital video broadcasting, DVB, uses specific MPEG transport stream packets for this purpose, the CA information of the inventive concept is embedded into MPEG transport stream packets which are frequently transmitted with digital multimedia broadcasting for reasons inherent to their functional principle, but are only partly used and therefore can also accommodate the CA information. These are advantageously those packets which contain the program association table PAT. In digital multimedia broadcasting, DMB, this table PAT is transmitted at least every 500 milliseconds by default (cf. ETSI TS 102 428, V1.2.1, paragraph 6.2) and occupies, for reasons inherent to their functional principle, an entire MPEG transport stream packet even though this table itself is relatively small (e.g. only 18 bytes). The rest of the packet, which has a gross size of 188 bytes, for example (cf. ISO/IEC 13818-1: 2007 (E), paragraph 2.4.3), remains unused.

This program association table PAT describes all of the programs contained within the MPEG transport stream. Since digital multimedia broadcasting by definition contains only one program per MPEG transport stream transmitted in a DAB subchannel (in contrast to DVB, wherein several programs may be contained within an MPEG transport stream), this table is very short. For details on this please see Reference [3], chapter 6.2, where it is noted that a program association table PAT is to describe one program.

As is common with MPEG, the CA information is encoded via so called CA descriptors. It is therefore also possible to use simulcrypt. One or more CA descriptors, each of which may also contain one or more entitlement key messages, are embedded into a PAT packet in each case (that is, in a transport stream packet containing a program association table PAT) (for example in a "CA_ECM_section" table, which will be described below in more detail, or in a "CA-_section" table, which will be described in more detail below). This means, therefore, that the CA information that are actually transmitted in some embodiments is similar to or even identical with the CA information transmitted with DVB. However, the data (e.g. the data of the CA information) is embedded at a different location, in accordance with the invention, specifically, for example, also in the PAT packets (e.g. in the "CA_section" and "CA_ECM_section" tables and/or in the "CA_data" tables, the latter being described in more detail below and also being contained within the PAT packets).

Embedding takes place in accordance with embedding, provided in the DMB standard, of so called PAD data. In this context, the fact that proprietary (private) data, in the present case the CA information, may also be embedded into an MPEG transport stream packet is made use of.

The "transport_private_data" field (a flag indicating transport of private data) within the so called adaptation field, "adaptation_field( )", in the message header of the transport stream packet serves this purpose. The so called adaptation_field( ) represents an adaptation field enabling transmission of additional information in the message header of a transport stream packet; said additional information may include, among others, so called "private" data, the content of which is not specified in the corresponding standards.

Embedding of the CA information is not limited to the program association table PAT (or to the transport stream packet containing the program association table PAT), however, but CA information may basically be embedded into any MPEG transport stream packet which contains enough free space. However, since a DMB encoder will typically fill all of the MPEG transport stream packets (or at least all of the MPEG transport stream payload data packets) with payload data in order to make use of the full data rate, most MPEG transport stream packets (or at least most MPEG transport stream payload data packets) will typically be completely filled with audio/video data or multimedia data and/or signaling. For this reason it is advantageous to utilize, for embedding the CA information, essentially or even exclusively those MPEG transport stream packets which contain the program association table (PAT), since they are not suitable anyway for embedding—in compliance with the standards—of encoded audio data and/or encoded video data due to a lack of an appropriate data field.

The concept of embedding CA information in the message header ("header") of a transport stream packet will be described below. Since the corresponding embedding has some similarities with embeddings of so called PAD data, a short comparison will be provided here. In PAD embedding, which is described, for example, in Reference [3], chapter 9, the PAD data is embedded in the so called "transport_private_data" field of the PAT packets (i.e., of the transport stream packets having a program association table PAT). The first byte of the "transport_private_data" field, which typically includes a plurality of bytes, carries an identifier describing which data is embedded into this field. While this value (or the value in the first byte of the "transport_private_data" field) for PAD data is 0, this value should be different for CA information. The "transport_private_data_length" parameter in the transport stream packet header accordingly signals the length of the field comprising the CA information plus 1 byte (said 1 or additional byte corresponding to the length of the field comprising the identifier). At least in some respects, embedding of the CA information therefore corresponds to embedding of PAD data. In some embodiments, the identifier distinguishes (or should distinguish) between both types of data.

The transmissible data rate will be briefly addressed below. The program association table PAT is transmitted at least every 500 milliseconds. If 150 bytes were used for CA information per PAT packet, i.e., per transport stream packet containing a program association table PAT, this would result in a data rate of 300 bytes per second or 2400 bits per second (bps) for the CA information.

This data rate possibly increases if other packets were used as well. In principle, it would also still be possible for the DMB encoder to occasionally leave entire MPEG transport stream packets unused (i.e., to insert so called "zero packets"). This might either have been specified in the configuration of the DMB encoder, or it may occur when a data stream of a dynamic data rate (e.g. so called BIFS multimedia data) does not utilize, for example for a short term, the preconfigured data rate. Said packets (padding or zero packets, from the perspective of the DMB encoder) may optionally also be utilized for CA information and may thus increase the data rate for the CA information.

The inventive method of embedding CA information at least partly—however, as an alternative, also exclusively—into PAT packets has the advantage, however, that the CA information may be embedded even when the DMB encoder utilizes the entire data rate available, i.e., does not insert any padding or zero packets.

To facilitate embedding of the CA information as well as encryption of the MPEG transport stream packets, it is advantageous (but not absolutely necessary), in accordance with the invention, to utilize only the PAT packets for embedding the CA information. The PAT packets are most suited because they may easily be identified by their packet type identifier (PID). Specifically, the packet type identifier for the PAT packets will be 0 (i.e., this value is precisely not defined by other transport stream packets). Moreover, the PAT packets are best suited for embedding the CA information because they are transmitted often enough, i.e., according to Reference [3], at least every 500 milliseconds, typically more frequently. In addition, the PAT packets are well suited for embedding the CA information because they reliably have free data capacities, in particular with DMB. Moreover, the PAT packets are well suited for embedding the CA information because decoding of the MPEG data stream starts with the program association table PAT and because, consequently, the CA information is available as early as at the reception of a PAT packet. The latter also ensures that the tune-in time may remain unchanged despite encryption, at least if the CA decoder (decoder for the access restriction information) forces no additional delay on the receive side.

Optionally, it would also be possible to use padding, or zero, packets for embedding the CA information, since the former may also be easily identified by means of their packet type identifiers (PID), (PID==0x1 FFF). Likewise, PMT packets may optionally be used, since they typically have free data capacities and typically directly follow PAT packets. The latter also ensures that the tune-in time may remain unchanged despite encryption.

However, padding, or zero, packets may optionally also be directly signaled as packets comprising CA information, of course, i.e., the packet type identifiers (PID) might be adapted accordingly. However, this typically does not apply to packets comprising a program mapping table (PMT).

Therefore, whenever sufficient padding, or zero, packets are available, the inventive method would not be necessary, and one might directly employ encryption in accordance with DVB. However, since the fact is that in most cases it is not ensured that there are sufficient padding packets available at any time which may be utilized for CA information, the inventive concept of embedding CA information into the PAT packets entails quite considerable advantages over the mentioned simplified concept of transmitting the CA information, since the data rate of the stream does not increase.

Several optional improvements which may be implemented in some embodiments in accordance with the invention will be described below.

If several DMB programs are encrypted within a DAB ensemble, it will be reasonable to transmit any entitlement management messages EMM in one single channel and therefore to transmit any services enabling operations and services extensions for any encrypted programs of the DAB ensemble in a separate channel. In this case, essentially only entitlement control messages (ECM) are to be transmitted within the encrypted DMB data stream. Therefore, embedding into the PAT packets already offers a sufficient data rate for the CA information (description of the methods used as well as of the entitlement control messages ECM). Packets comprising a program association table PAT may be very easily identified since the PID (program identification) parameter, which is also referred to as a packet type identifier here, has the fixed value of 0 at the beginning of each MPEG transport stream packet (provided it is a PAT packet).

It shall be explained briefly below how the master channel (i.e., a separate channel comprising EMM information) is signaled and (is) recognized at the receiver device. Unambiguous access, either to a predefined fixed channel and/or to a channel which may be unambiguously identified as such, may be enabled in the following manner, for example:

1. A fixed subchannel (e.g. subchannel 63) may be used without any further signaling;
2. A fixed services label may be used, e.g., "EMM.CAS". Receivers will then search for a service of this name and will use it if need be (e.g. for receiving EMM).
3. A user application identifier may be transmitted in the proprietary area. Then the service (which enables transmission of the EMMs) might have any label desired, but would still be visible on the receivers without any access restriction ("non-CA receivers");
4. The master channel is "adhered" to the DMB service as a secondary services component, and the user application identifier ("UserApplicationId") indicates that they are EMMs. Such a solution has several advantages. So the receiver searches for DMB. This may be the primary services component. If there is (at least) one secondary services component, and if same uses the EMM user application identifier (UserApplicationId) yet to be specified, the EMMs may be found there.

Details regarding exemplary encoding of the CA information will be explained in more detail below.

It shall be noted that the transport stream provider 230 may be configured to provide the MPEG2 transport stream 232 in such a manner that same comprises one or all of the properties explained above.

Figure 2B:
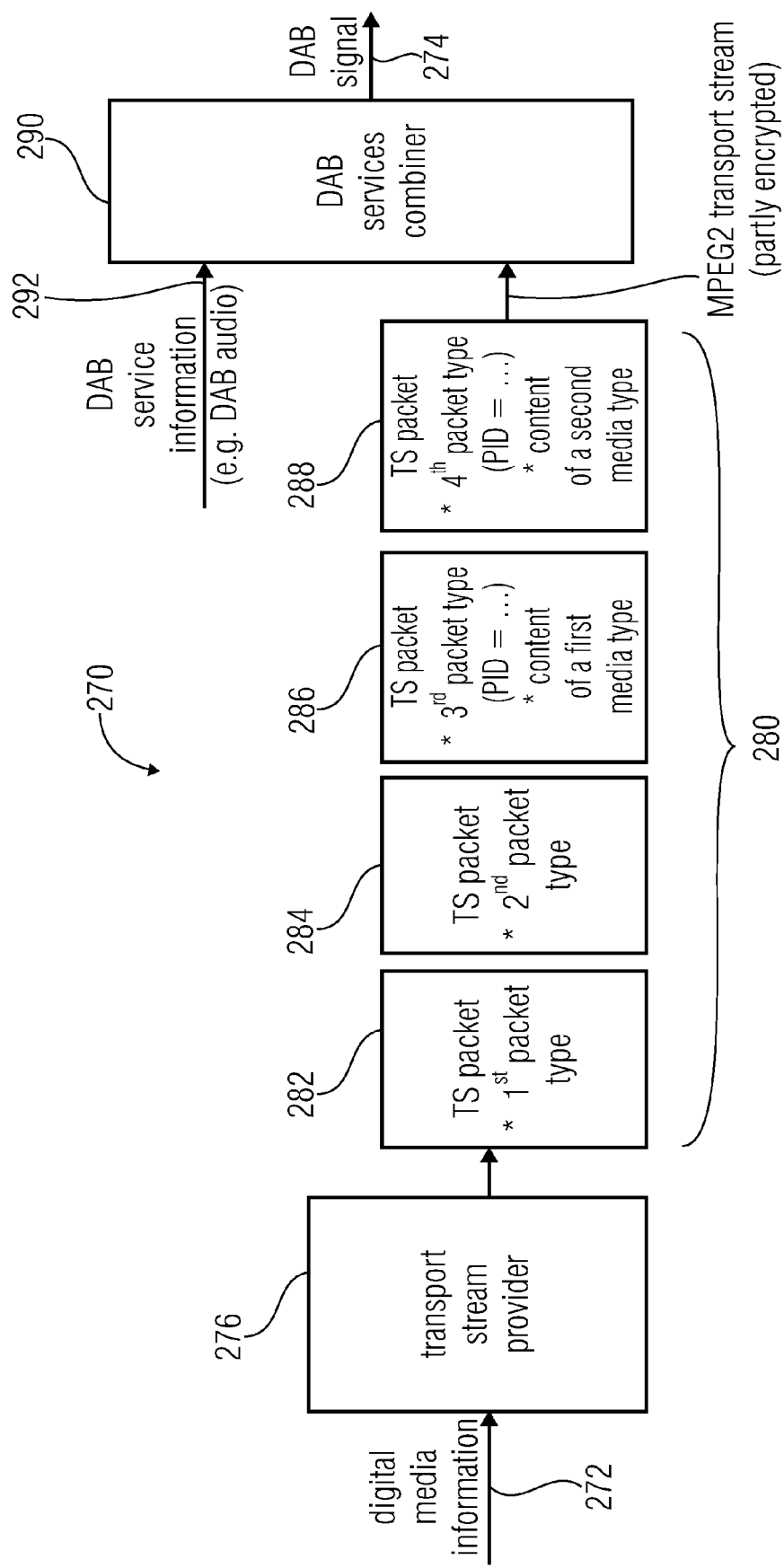

2.2 DAB Signal Provider of FIG. 2B

A DAB signal provider 270 of FIG. 2B will be briefly explained below. The DAB signal provider 270 is configured to receive digital media information 272, which may correspond to the digital media information 210, for example. The DAB signal provider 270 is further configured to provide a DAB signal 274, which may correspond to the DAB signal 220, for example. The DAB signal provider 270 includes a transport stream provider 276 configured to receive the digital media information 272 and to provide an at least partly encrypted transport stream 280 on the basis thereof.

The DAB signal provider 270 further includes a DAB services combiner 290 configured to combine the MPEG2 transport stream 280 provided by the transport stream provider 276 with one or more other DAB services 292 so as to obtain the DAB signal 274.

The transport stream provider 276 is configured, for example, to provide a transport stream packet 282 of a first packet type which includes a program association table PAT and access restriction information comprising key information ECM. The transport stream provider 276 is further configured to provide transport stream packets of a second packet type which contain a reference to packet type identifiers of transport stream payload data packets. The transport stream provider is further configured to provide transport stream packets 286 of a first further packet type (e.g. of a third packet type) which describe a content of a first media type of the digital media information 272 (e.g. audio), and to provide transport stream packets 288 of a second further packet type (e.g. of a fourth packet type) which describe a content of a second media type of the digital media information 272 (e.g. video). The transport stream provider 276 is configured to provide the transport stream 280 in such a manner that a content of at least some of the transport stream packets of the first further packet type (e.g. of the third packet type) is encrypted or that a content of at least some of the transport stream packets of the second further packet type (e.g. of the fourth packet type) is encrypted. Moreover, the transport stream provider 276 is configured to provide the access restriction information contained within the transport stream packets 282 of the first packet type in such a manner that it includes key information for decrypting the encrypted contents of the transport stream packets 286 of the first further packet type (e.g. of the third packet type) or the encrypted contents of the transport stream packets 288 of the second further packet type (e.g. of the fourth packet type). Thus, at least some contents of the MPEG2 transport stream 280 are protected from non-entitled access by means of appropriate content encryption. The key information that may be used for decrypting is embedded into the transport stream packets 282 of the first packet type by the transport stream provider 276. The question whether or not the transport stream provider 276 encrypts the encrypted contents of the transport stream packets of the first further packet type (e.g. of the third packet type) and/or of the second further packet type (e.g. of the fourth packet type) itself or already obtains at least partly encrypted digital media information 272 is of minor importance; both alternative solutions may be employed.

3. TRANSPORT STREAM ANALYZER OF FIG. 3

Figure 3:
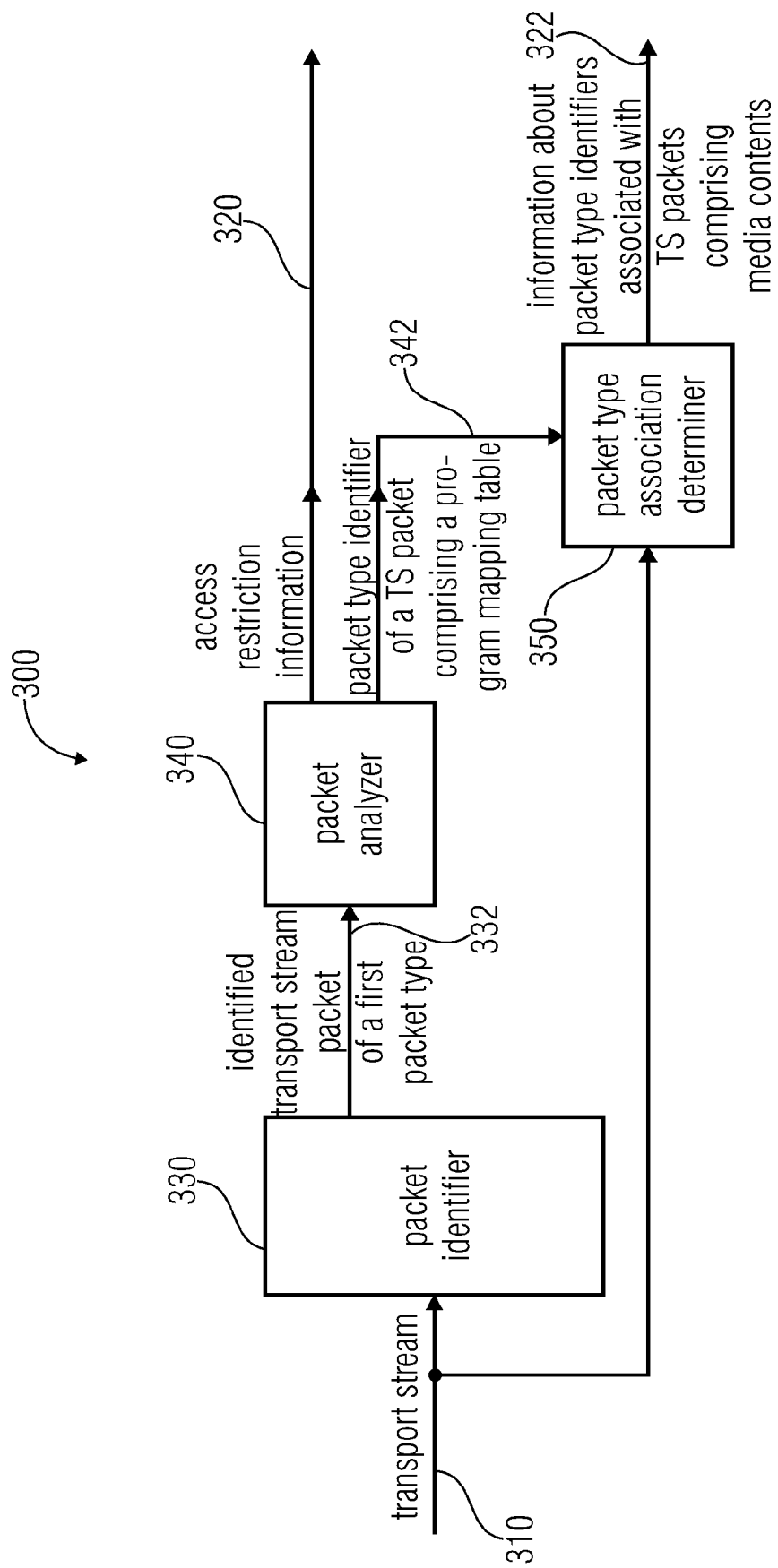
FIG. 3 shows a block diagram of a transport stream analyzer in accordance with an embodiment of the present invention.

A transport stream analyzer 300 in accordance with an embodiment of the present invention will be described below with reference to FIG. 3, which shows a block diagram of such a transport stream analyzer 300. The transport stream analyzer 300 is configured to receive a transport stream 310 and to provide, on the basis thereof, both access restriction information 320 and information 322 about packet identifiers associated with transport stream packets having media contents. The transport stream analyzer 300 includes a packet identifier 330 configured to identify a packet 332 of a predefined first packet type, which comprises a predefined first packet type identifier and contains a program association table PAT, as an identified packet. The transport stream analyzer 300 further includes a packet analyzer configured to search the identified transport stream packet 332 of the first packet type for access restriction information and to provide the access restriction information 320 found. The packet analyzer 340 is advantageously further configured to evaluate the program association table within the identified transport stream packet 332 of the predefined first packet type and to determine, on the basis of the program association table PAT, a second packet type identifier 342 associated with a transport stream packet having a program mapping table. The transport stream analyzer includes a packet type association determiner 350 configured to identify, on the basis of the determined second packet type identifier 342, a transport stream packet having a program mapping table within the transport stream and to evaluate the program mapping table so as to obtain information 322 about which packet type identifiers are associated with transport stream packets containing media contents of the access-restricted digital media information.

The transport stream analyzer 300 is therefore configured to extract, from a transport stream 120, 232, 280, that information which may be used for retrieving the encoded and at least partly encrypted media contents of the digital media information 110, 210, 272. For this purpose, the transport stream analyzer 300 efficiently analyses precisely those transport stream packets which have the relevant information embedded therein. By identifying and analyzing the transport stream packets of the first packet type, the transport stream analyzer 300 obtains the access restriction information 320 very fast and efficiently, so that retrieval of the access restriction information results in no unnecessary delay in evaluating the transport stream 310. Moreover, the transport stream analyzer 300 exploits the fact that in the transport stream packets of the first packet type, a bit capacity for embedding the access restriction information 320 is available anyway, which in alternative concepts would remain unused. In addition, in the transport stream analyzer 300, retrieval of the access restriction information is independent of the transport stream payload data packets, so that said transport stream payload data packets (of a further packet type or of several further packet types, such as of the third packet type or of the fourth packet type) need not be searched in order to obtain the access restriction information 320. In some embodiments, the further packet types are only audio or video. In other embodiments, other, further packet types are additionally used, for example for transmitting multimedia information.

The transport stream analyzer 300 may optionally comprise a decrypter configured to decrypt any encrypted media contents, which are contained within transport stream packets having packet type identifiers described in the program mapping table, while using the access restriction information contained within the transport stream packet of the predefined first packet type. In other words, such transport stream packets of which the packet type identifiers are described by the information 322 may be filtered out of the transport stream 310. The access restriction information 320 which, e.g., includes key information, may then be used for decrypting said filtered-out packets. The key information may be present in an encrypted form, for example, so that the transport stream analyzer 300 may decrypt same on the basis of its knowledge of a secret (e.g. of a secret key).

In a further embodiment, the transport stream analyzer 300 may be configured to check the identified transport stream packet 332 of the predefined first packet type as to whether an additional information field comprises one or more tables characterized by predefined table identifiers and containing access restriction information. The transport stream analyzer 300 may subsequently provide the access restriction information contained within identified tables. The corresponding functionality may be performed, for example, by the packet analyzer 340. The packet analyzer 340 is advantageously configured to check—in response to finding the first table which is characterized by a first predefined table identifier and contains access restriction information and in dependence on table length information contained within the first table—whether the additional information field of the identified transport stream packet 332 of the predefined first packet type comprises, following the first table, a further table containing access restriction information. If such a further table is identified, the access restriction information contained within said further table is provided by the packet analyzer 340. Due to its appropriate configuration, the packet analyzer 340 is capable of evaluating extensive access restriction information distributed across several tables, as will be explained in more detail below. Consequently, the transport stream analyzer 300 is capable of extracting various kinds of access restriction information from an additional information field of a single transport stream packet, which in turn enables encoding of complex access restriction information within a single transport stream packet.

4. DAB RECEIVER OF FIG. 4

Figure 4:
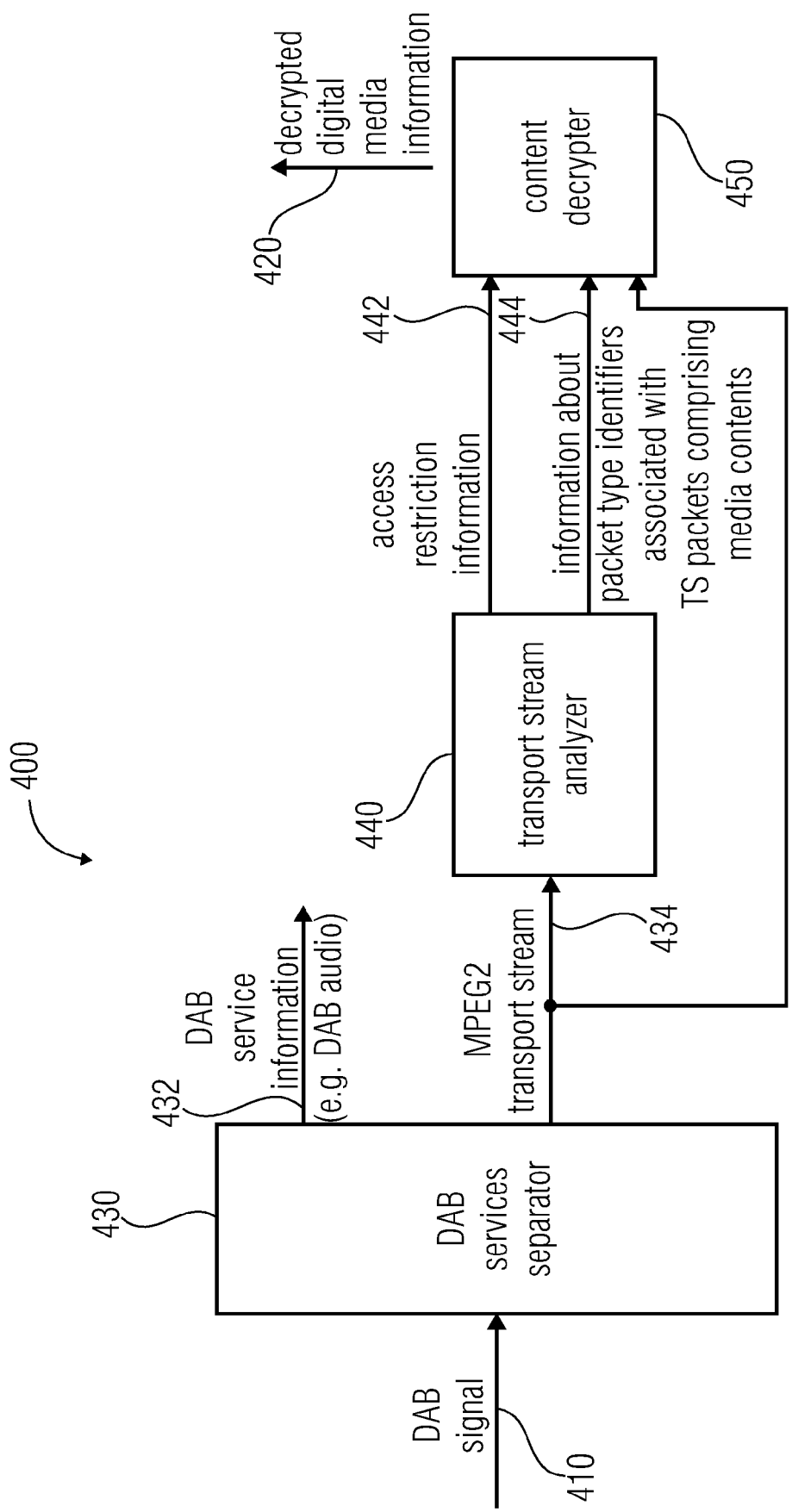
FIG. 4 shows a block diagram of a DAB receiver in accordance with an embodiment of the present invention.

A DAB receiver of FIG. 4 will be described below. FIG. 4 shows a block diagram of such a receiver 400. The DAB receiver is configured to receive a DAB signal 410 advantageously including at least partly encrypted digital media information (advantageously even multimedia information) and to provide decrypted digital media information (or even decrypted digital multimedia information) 420 on the basis thereof. The DAB receiver 400 includes a DAB services separator 430 configured to receive the DAB signal 410 and to provide, on the basis thereof, DAB service information 432 including DAB audio information, for example, as well as an MPEG2 transport stream 434. The DAB receiver further includes a transport stream analyzer 440 which corresponds, e.g., to the transport stream analyzer 300 described by means of FIG. 3. The transport stream analyzer 440 is configured to receive the MPEG2 transport stream 434 from the DAB services separator 430 and to provide the access restriction information 442 for decrypting the access-restricted digital media information on the basis of the MPEG2 transport stream 434. The DAB receiver 400 further includes a content decrypter 450 configured to decrypt encrypted media contents of the access-restricted digital media information while using the access restriction information 442 and, thus, to obtain the decrypted digital media information 442.

The content decrypter 450 may be configured, for example, to select any packets to be decrypted in dependence on information 444 about packet type identifiers associated with transport stream packets comprising media contents, which information is provided by the transport stream analyzer 440, and/or to extract said packets from the MPEG2 transport stream 434.

Thus, the DAB receiver 400 may efficiently obtain decrypted digital media information 420 from the DAB signal 410, the DAB receiver 400 exploiting the inventive concept for embedding access restriction information in transport stream packets comprising a program association table PAT so as to obtain the access restriction information 442 as fast as possible and at a low resource overhead.

5. STRUCTURE OF THE TRANSPORT STREAM AND ENCODING OF THE CA INFORMATION

The structure of the transport stream and encoding of the CA information will be explained in detail below. It should be taken into account, in this respect, that the transport stream provider 100 and/or the DAB signal provider 200 are configured to provide a transport stream of the structure described below. Moreover, the transport stream analyzer of FIG. 3 and/or the DAB receiver of FIG. 4 are configured to evaluate a corresponding transport stream.

5.1. Transport Stream of FIGS. 5a and 5b

Figures 5A, 5B:
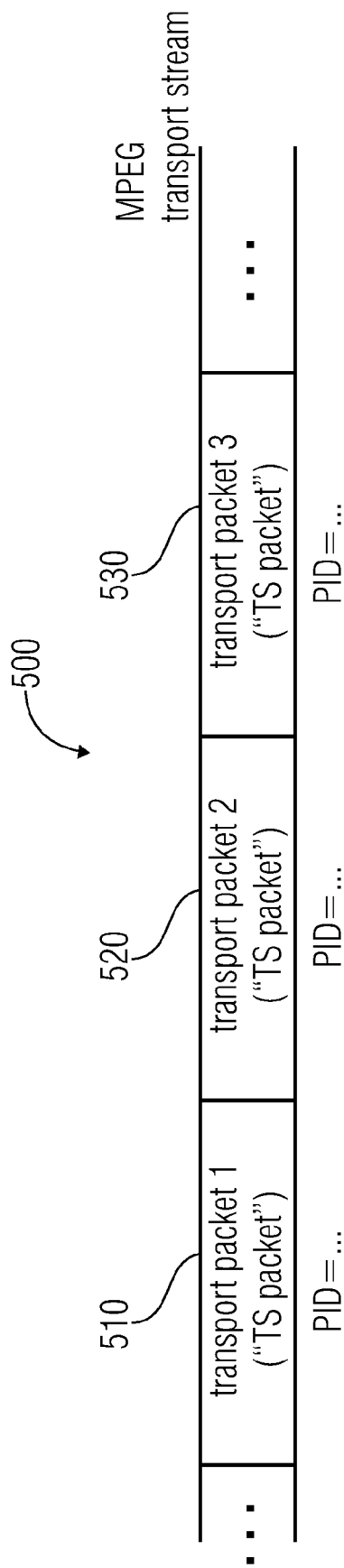
FIG. 5A shows a schematic representation of transport stream packets of an MPEG2 transport stream.
FIG. 5B shows a syntax representation of an MPEG2 transport stream.

FIG. 5a shows a schematic representation of a transport stream, which is an MPEG2 transport stream, for example. The MPEG2 transport stream 500 includes a sequence of transport stream packets 510, 520, 530 which are referred to as "TS packets" for short and which have different packet type identifiers associated with them. However, it shall be noted here that of course, transport stream packets of the same packet type and/or comprising the same packet type identifier typically occur again and again.

FIG. 5b shows a syntax description of an MPEG transport stream. A continuous sequence of transport stream packets ("transport_packet") may be recognized in that a synchronization bit sequence, for example in the form of a synchronization byte, occurs at the beginning of each transport stream packet. Details regarding the syntax of an MPEG transport stream are defined, e.g., in ISO/IEC 13818-1 so that for any details reference shall be made to said document.

5.2. Overview of Different Types of Transport Stream Packets of FIG. 6

Figure 6A:
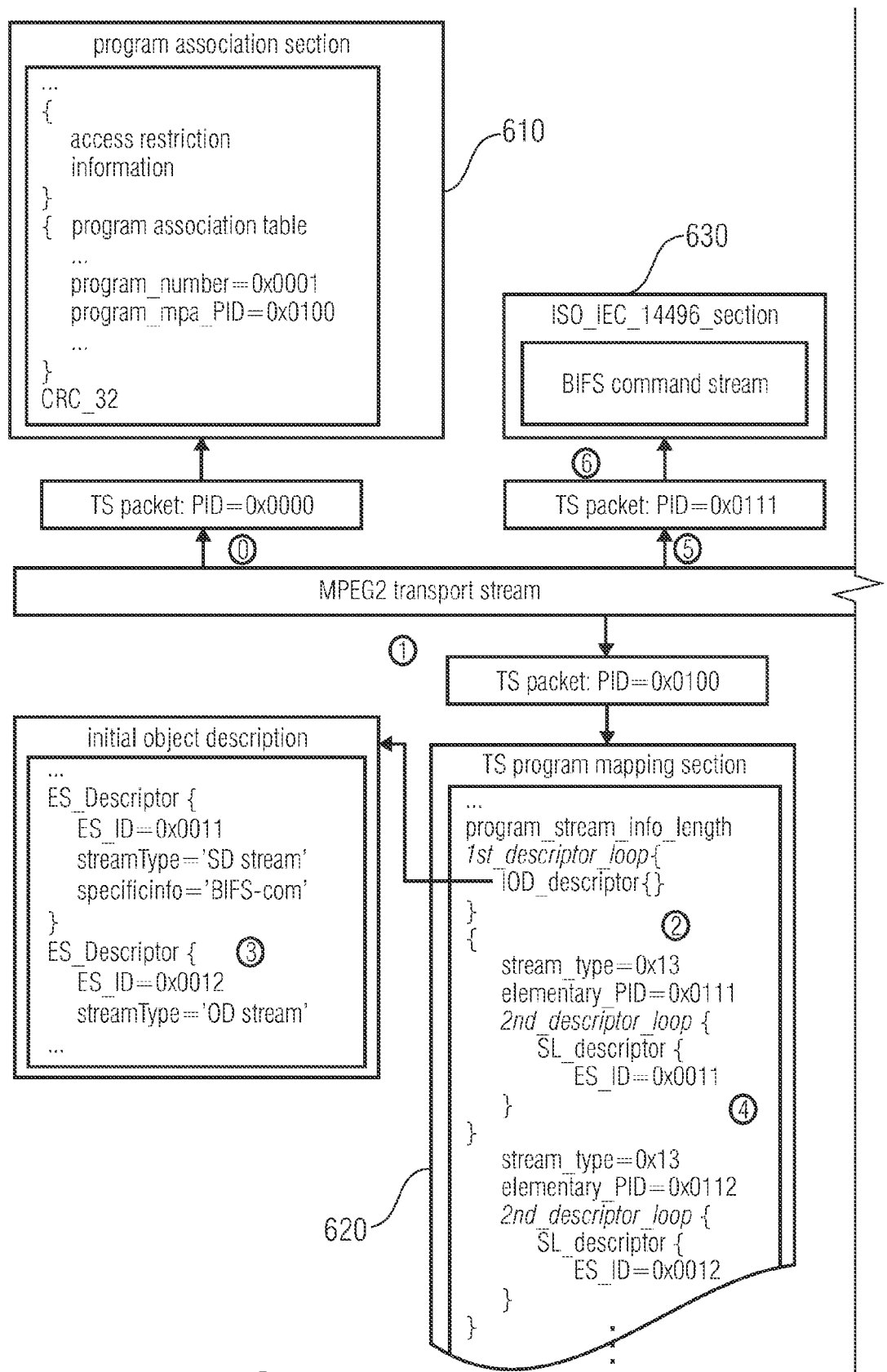
FIGS. 6A and 6B show a schematic representation of transport stream packets employed in the transmission of multimedia content.
Figure 6B:
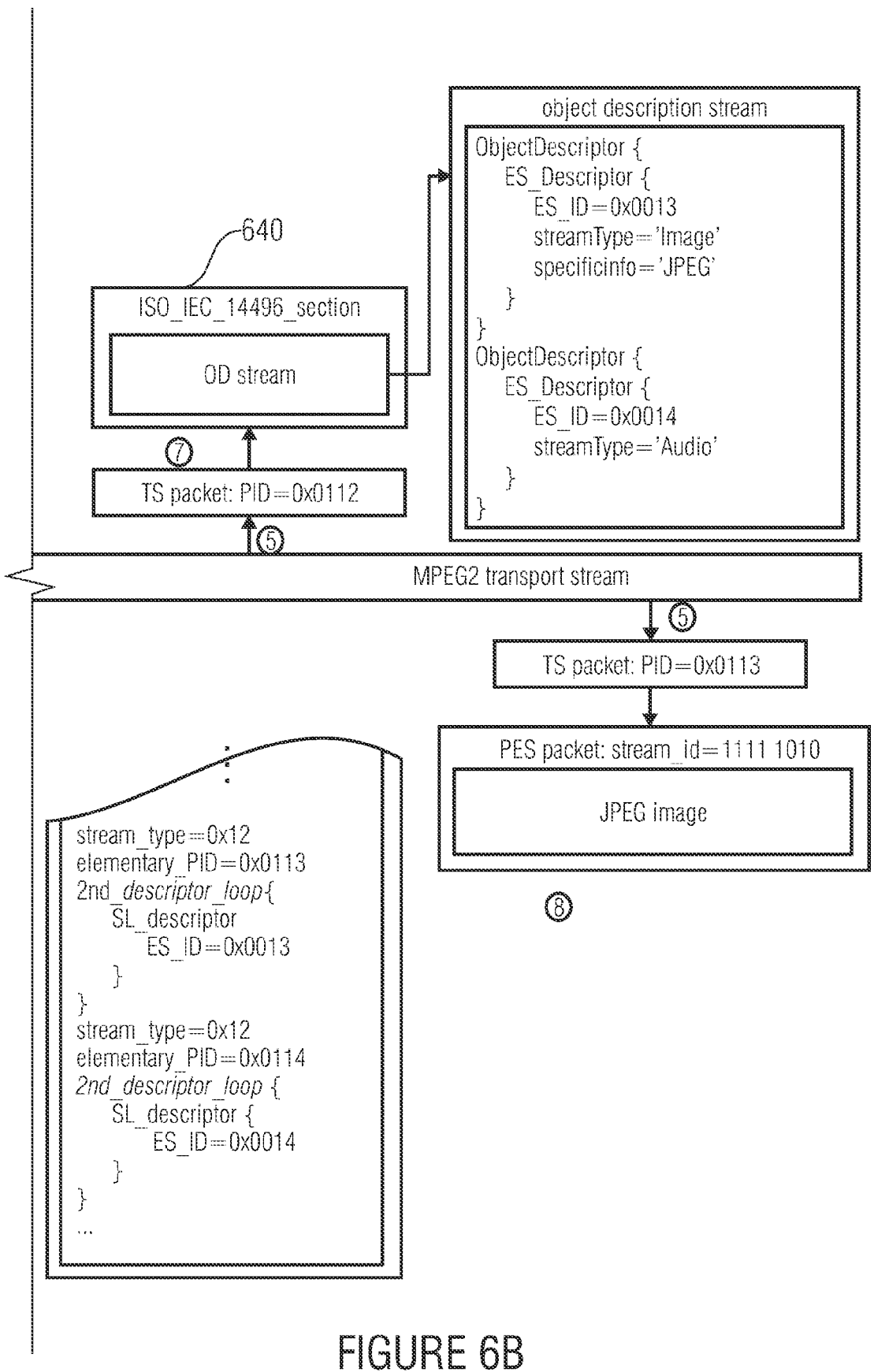

FIG. 6 shows a schematic representation of different packet types contained within a multimedia MPEG2 transport stream in accordance with the present invention. The packet types shown in FIG. 6 are suitable, for example, for transmitting multimedia information while using a data stream mode of the DAB transmission concept. Details regarding the transport stream packet types shown in FIG. 6 are described in ETSI TS 102 428 V1.2.1. In particular, please refer to the description in Annex 2 of ETSI TS 102 428 V1.2.1, page 30. However, the data stream described in FIG. 6 is modified to the effect that the program association section also includes the access restriction information in addition to the program association table PAT.

Thus, the MPEG transport stream of FIG. 6 comprises a transport stream packet 610 of a first packet type which is characterized by a packet type identifier PID=0x0000. The program association table PAT of the transport stream packet 610 defines that a program association table which belongs to the program having the program No. 0x0001 is contained within a transport stream packet 620 of a second packet type. For this purpose, the program association table PAT of the first transport stream packet 610 includes a reference to the packet type identifier 0x0100 of the transport stream packet 620 of the second packet type. The program mapping table within the transport stream packet 620 includes, among others, references to further transport stream packets having the packet identifiers PID=0x0111, PID=0x0112, PID=0x0113 and PID=0x0114. Thus, the program association table PMT of the transport stream packet 620 also refers, among others, to transport stream packets having a further packet type (e.g. a third packet type) and having the packet type identifier PID=0x0113 associated with them and containing, e.g., encoded image information. Moreover, the program association table PMT of the second transport stream packet 620 refers to transport stream packets of a further packet type (e.g. of a fourth packet type) having an associated packet type identifier PID=0x0114 and describing an audio content of the multimedia information.

In addition, the program association table PMT of the second transport stream packet 620 includes references also to transport stream configuration packets 630, 640 comprising, e.g., packet identifiers PID=0x0111 and PID=0x0112. Please refer to ISO/IEC13818-1 and ISO/IEC14496-1 for any details regarding the meaning of said configuration packets 630, 640. Details are not of importance here. However, for any further information please refer to the standards mentioned, which are well known to any person skilled in the art.

5.3. Structure and Syntax of the Transport Stream Packet of the First Packet Type of FIGS. 7, 8*a* and 8*b*

Figure 7:
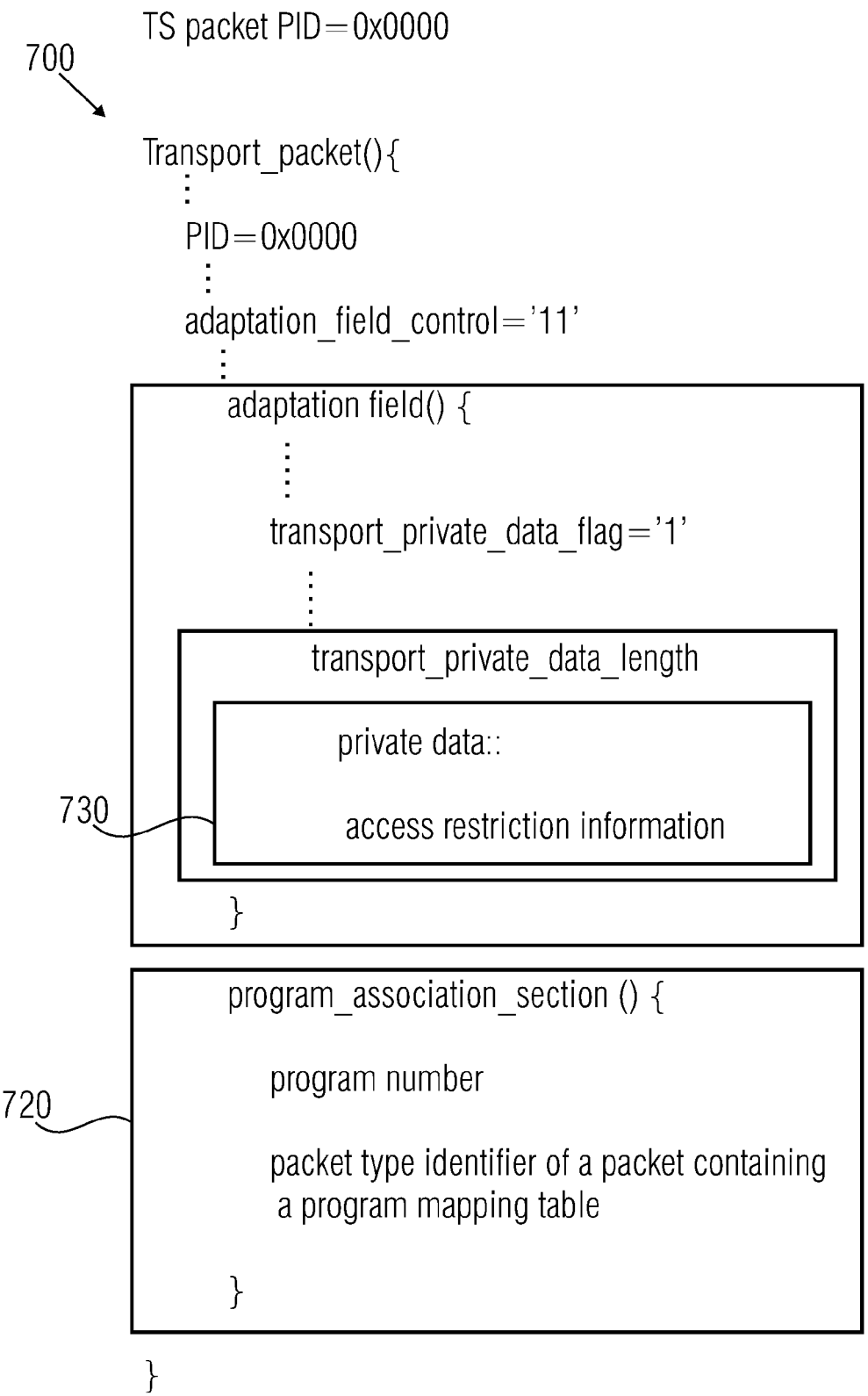
FIG. 7 shows a schematic representation of a transport stream packet including access restriction information and a program association table.
Figure 14:
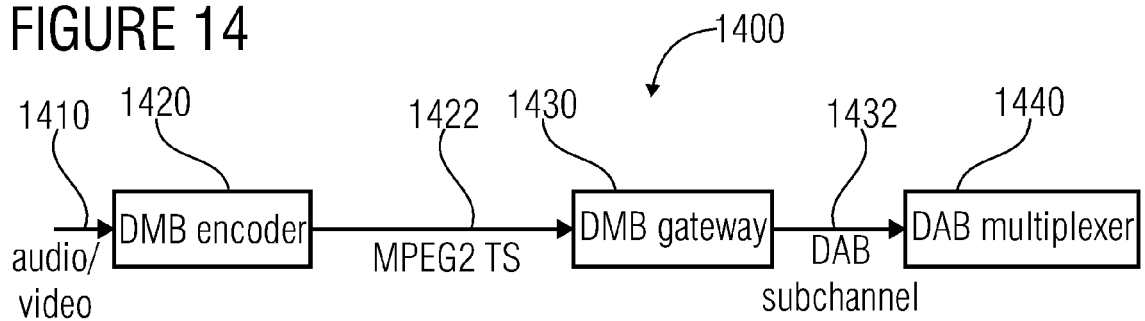
FIG. 14 shows a block diagram of a conventional DAB signal provider.

By means of FIG. 7, the precise structure of a transport stream packet of the first packet type (PID=0x0000), which contains both the access restriction information and the program association table PAT, will be described below. The transport stream packet of the first packet type includes the packet type identifier PID=0x0000 at a predetermined position of a packet header (also referred to as a preamble), so that the transport stream packet of the first packet type may be found and/or identified without any effort.

The transport stream packet of the first packet type further includes a 2-bit marker ("adaptation_field_control") indicating whether there is a so called adaptation field ("adaptation_field"), and further indicating whether there is a program association table PAT within a program association section ("program_association_section"). In the following it shall be assumed that both the adaptation field, which may be regarded as an additional information field, and the program association table PAT are present within the program association section.

The adaptation field includes a 1-bit flag "transport_private_data_flag" indicating whether the adaptation field includes so called "private data" which typically is not subject to the standardization within the framework of the ISO/IEC. In addition, the adaptation field comprises, at least in the event of the existence of private data, "transport_private_data_length" information indicating the length of the private data. The adaptation field further includes the private data (also referred to as private data bytes, or "private_data_byte"), which here includes and/or consists of access restriction information. The access restriction information may be stored in one or more tables which is/are part of the private data, as will be explained in more detail below.

The structure of a transport stream packet will be briefly explained in the following by means of the syntax description of FIG. 8*a*. A transport stream packet ("transport_packet") which is part of an MPEG2 transport stream includes, among others, a synchronization byte "synch_byte" contained within a 4-byte prefix of the transport stream packet. The transport stream packet further includes a packet type identifier PID indicating the packet type. The transport stream packet further includes a 2-bit flag "transport_scrambling_control" indicating whether the data content of the transport stream packet is encrypted and/or by key the data content of the transport stream packet is encrypted. The transport stream packet further includes a 2-bit flag "adaptation_field_control" indicating whether there is a so called "adaptation field" ("adaptation_field") and whether there are data bytes (data_byte). The so called adaptation field advantageously precedes the other data bytes in the transport stream packet. For any details regarding the meaning of the individual syntax elements, please refer to ISO/IEC13818-1.

FIG. 8*b* shows a syntax representation of an adaptation field of a transport stream packet. The adaptation field includes an adaptation field length value "adaptation_field_length" indicating the length of the adaptation field. The adaptation field includes a plurality of flags: "discontinuity_indicator", "random_access_indicator", "elementary_stream_priority_indicator", "PCR_flag", OPCR_flag", "splicing_point_flag", "transport_private_data_flag" and "adaptation_field extension_flag". The "transport_private_data_flag" flag indicates whether the adaptation field includes so called "private data" not specified by the ISO/IEC and utilized, in accordance with the invention, for transporting access restriction information.

For example, the adaptation field optionally includes "program_clock_reference_base" and "program_clock_reference_extension" parameters when the "PCR_flag" flag is set. Moreover, the adaptation field optionally includes a "splice countdown" parameter when the "splicing_point_flag" flag is set.

The adaptation field further includes a private data section if the "transport_private_data_flag" flag is set. If present, the private data section includes a length indication "transport_private_data_length" indicating the length of the private data section. If present, the private data section further includes one or more private data bytes "private_data_byte". The private data bytes "private_data_byte" are employed, in an advantageous embodiment of the invention, for encoding the access restriction information. In other words, the private data section of an adaptation field "adaptation_field" in a transport stream packet carrying the program association table and being characterized by a corresponding packet type identifier PID=0x000 includes the access restriction information, for example in the form of one or more tables, which will be explained in more detail below. For details regarding the syntax of the adaptation field, please refer to ISO/IEC13818-1 and to ETSI TS 102 428 V1.2.1.

5.4. Syntax of the "CA_section", "CA_ECM_section" and "CA_data" Tables

The syntax of different tables containing the access restriction information will be described below with reference to FIGS. 9*a*, 9*b*, 10, and 11. The access restriction information described, for example, by the private data section of the adaptation field of FIG. 8, may comprise, for example for describing entitlement management messages, a table section having the syntax of FIGS. 9*a* and 9*b*. The table section includes, e.g., a table identifier "table_id" designating the type of table. The table identifier "table_id" may be unambiguously selected, for example, so as to distinguish the table of FIGS. 9*a* and 9*b* from other tables comprising access restriction information. The table section of FIG. 9*a* further includes a "section_syntax_indicator" flag, which may be set to a predetermined value, for example. The table section further includes length information "section_length" describing a length of the section. In addition, the table section includes a "version_number" identifier describing a version number of the syntax. A "current_next_indicator" flag indicates whether the transmitted information is to be applied for a current content or for a media content transmitted at a later point in time. A "section_number" information indicates a number of a section so as to enable the access restriction information to be distributed across several sections. A "last_section_number" information describes a number of a last section. Moreover, the section of FIG. 9a includes one or more descriptors "descriptor", the syntax and meaning of which is explained by means of the syntax description of FIG. 9b. Finally, a table section of FIG. 9a also includes a "CRC_32" checksum.

The "CA_descriptor" descriptor, the syntax of which is shown in FIG. 9b and which may adopt the role of the "descriptor" shown in FIG. 9a, includes a "descriptor_tag" descriptor identification and a "descriptor_length" descriptor length indication. Moreover, the descriptor described in FIG. 9b includes a "CA_system_ID" system identification describing the type of the access restriction system. Moreover, the descriptor of FIG. 9b includes a packet type designator "CA_PID" indicating the packet type identifier PID of such transport stream packets which contain entitlement management message information. Consequently, the descriptor may comprise an indication of specific transport stream packets comprising the packet type identifier CA_PID. However, the indication "CA_PID" may also be regarded as a reference to another table which is contained within the private data area of the same transport stream packet or of a different transport stream packet and which comprises an identifier which is equal to the value of "CA_PID" described by the descriptor. Thus, a reference may be established between a "CA_section( )" table and a "CA_data( )" table. Alternatively (i.e. as an alternative to a reference to a different transport stream packet and/or to a different table), the descriptor may also directly include entitlement management messages, however, which may be attached, e.g., as private data bytes ("private_data_byte") at the end of the respective descriptor.

Alternatively or additionally, the descriptor may also comprise a reference to a specific channel wherein the entitlement management messages EMM are transmitted.

By means of the syntax description of FIG. 10, the manner in which references to entitlement control messages may be encoded will be set forth below. The syntax description of FIG. 10 describes a table which may be contained within the private data section of the adaptation field of FIG. 8b, for example as an alternative to the table of FIG. 9a or additionally to the table of FIG. 9a. One may see that the syntax of the "CA_ECM_section( )" table of FIG. 10 essentially corresponds to the syntax of the table of FIG. 9a. However, different descriptors "descriptor" may be used in the table of FIG. 10 than in the table of FIG. 9a. For example, the descriptors in the table of FIG. 10 may directly represent the entitlement control messages ECM instead of merely representing references.

For details regarding the meaning of the individual syntax elements of the table of FIG. 10, please refer to the description regarding the table of FIG. 9a. In both tables, however, not all of the indicated flags and/or values are necessary, so that some of the flags and/or values which do not immediately refer to the access restriction information may optionally be dispensed with.

FIG. 11 shows a syntax description of a further table comprising access restriction information which may be contained within the private data area of the adaptation field of FIG. 8b alternatively or additionally to the tables of FIGS. 9a and 10. The table of FIG. 11 includes a "table_ID" table identifier, which typically adopts a different value than the table identifiers of the tables of FIGS. 9a and 10. In addition, the table of FIG. 11 may comprise an indication "CA_PID" (in the form of a packet type identifier). The "CA_PID" reference in the "CA_data( )" table may refer to a packet type, for example, which includes additional access restriction information. Alternatively, the "CA_PID" value in the "CA_data( )" table may also indicate that the "CA_data( )" table carries information that would normally be contained within a separate transport stream packet of the "CA_PID" type. Thus, reference may be made to the "CA_data( )" table from a different table, e.g. the "CA_section( )" table or the "CA_ECM_section( )" table, the "CA_data( )" table being identified as a reference target by the value in the "CA_PID" field. The table of FIG. 11 may further contain proprietary access restriction information in a "proprietary_CA_information" field, the length of which may be described, for example, by a "CA_info_length" length description.

In the following, several aspects regarding exemplary encoding of the CA information will be summarized. Embedding of the CA information is performed, for example, in the "transport_private_data" field within the adaptation field "adaptation_field( )" in the transport stream packet header. Said embedding is performed in a manner that is analogous to that described in Reference [3]. In an embedding process as is described in Reference [3], the first byte (within the sequence of "private_data_byte" data values) indicates which data is embedded in the "transport_private_data" field (also referred to as private data area). In table 12, Reference [3] describes the following entitled identifiers for transporting private data:

| Identifier | Payload |
|---|---|
| 0 | PAD |
| 1 to 255 | Reserved |

The exemplary encoding described below supplements said encoding and ensures that the first byte in the "transport_private_data" field (following the "transport_private_data_length" length description) differs from the value of 0 (which is already provided for PAD) in each case.

In this respect it shall be noted that PAD data is permitted for DMB radio only (that is, not for DMB television). However, the encoding proposed in the following ensures even for DMB radio that an existing DMB radio receiver would not interpret data of the "transport_private_data" field, said data relating to an access restriction, as PAD data.

While the PAD encoding which is used when the first byte (following the "transport_private_data_length" length description) has the value of 0 assumes that any further data of the "transport_private_data" field is now PAD data, the following encoding ensures that several data fields of different types may be stored in a "transport_private_data" field (and may be extracted therefrom by a transport stream analyzer).

The following access restriction information is to be differentiated:

References to entitlement management messages EMM; they may be encoded, for example, just like the access restriction section "CA_section( )" of Reference [6], bearing a reference to a PID of the entitlement management packets (EMM packets) in the same MPEG transport stream (possibly also encoded in accordance with the proprietary entitlement control messages ECM) or a different MPEG transport stream.

References to entitlement control messages ECM; they may be encoded, e.g., as will be described below with regard to the "CA_ECM_section( )" table, possibly in connection with the "CA_data( )" table.

Data structures for the proprietary entitlement control messages ECM and other CA data; they may be encoded as will be described below, for example.

References to entitlement control messages ECM may be encoded, for example, as is described by means of the syntax description of FIG. 10. Encoding in accordance with the syntax description in FIG. 10 is essentially identical with the encoding of the "CA_section( )" access restriction section in accordance with Reference [6]; only the "table_ID" table identifier would be a different one since this table serves to find entitlement control messages ECM, whereas the "CA_section( )" table serves to find entitlement management messages EMM. The "table_ID" table identifier might be equal to 0x2 for the "CA_ECM_section( )" table, for example, so as to be able to distinguish this information from the PAD data for DMB radio (table identifier 0x0) and from the data of a "CA_section( )" table (table identifier 0x1).

The identifiers or packet type identifiers ("CA_PID_values") contained within the descriptor "CA_descriptor" of the tables of FIGS. 9a and 10 ("CA_ECM_section ( )" and/or "CA_section( )") typically identify the packet types PID of those transport stream packets which contain ECM information ("CA_ECM_section( )" table of FIG. 10) or EMM information ("CA_section( )" table of FIG. 9a). In accordance with the present invention, the "CA_PID" identifiers may be used as identifiers so as to identify the proprietary CA information ("proprietary_CA_information( )") contained within a "CA_data( )" table. In other words, instead of using separate transport stream packets having an associated specific packet type for transmitting the ECM information and/or the EMM information, the ECM information and/or the EMM information may be contained within "CA_data( )" sub-tables of FIG. 11. Just like the "CA_section( )" and "CA_ECM_section( )" tables, said "CA_data( )" sub-tables may be contained within the adaptation field and/or in the private data area ("private_data_byte") of the adaptation field ("adaptation_field"). The CA_section( ), CA_ECM_section( ) and CA_data( ) tables are advantageously contained within transport stream packets comprising the program association table, since there is usually still sufficient space within said packets, irrespective of the encoding bitrate of the payload data (audio data and/or video data).

The data structure for ECM information, which basically may also be used for EMM information and other CA data (i.e. data for access restriction), may be encoded, e.g., as is shown in the syntax description of FIG. 11. If need be, i.e. for example in the event of a high data requirement, the proprietary CA information ("proprietary_CA_information( )") may also allow fragmentation. Precise encoding is left up to the respective access restriction system, or CA system. A table comprising CA information and designated by "CA_data( )" includes, e.g., a "table_ID" table identifier as well as an "CA_PID" identifier. The CA_PID identifier corresponds to an identifier contained, e.g. by means of the value "CA_PID", in a descriptor "CA_descriptor( )" of a "CA_section( )" table. For example, the "CA_section( )" table includes, via the CA_PID value of the descriptor "CA_descriptor", a reference to specific "CA_data( )" table. In other words, the CA_PID value of the "CA_data( )" table indicates the subordinate "CA_section( )" table and/or "CA_ECM_section( )" with which the proprietary CA information "proprietary_CA_information( )" contained within the "CA_data( )" table is associated. The "CA_data" table includes a "CA_info_length" length indication indicating a length of the proprietary CA information "proprietary_CA_information( )" contained within the "CA_data( )" table.

The "table_ID" table identifier of the "CA_data( )" table may be 0x3, for example, so as to be able to distinguish said information from the PAD data for DMB radio, from "CA_section( )" and "CA_ECM_section( )".

A sequence of the "CA_section( )", "CA_ECM_section( )" and/or "CA_data( )" tables is advantageously transmitted in the "transport_private_data" field of the PAT packets (and, optionally, also of the padding, or zero, packets). Since each individual element (and/or each individual table) carries a type indication (the "table_ID" table identifier) as well as a length indicator (e.g. the "section_length" length indicator) and/or the length indication "CA_info_length", this sequence (of tables) may readily be split up again into the individual elements (individual tables).

The actual encryption may be effected, e.g., at the MPEG transport stream level. In this context, it is left up to the encrypter, or scrambler, whether all of the packets, except for packets having the program association table PAT and/or padding packets, or zero packets, are encrypted, or whether encryption is effected in a more selective manner, so that e.g. the program mapping table PMT and an audio component are left unencrypted. In the event of partial encryption, the program association table PAT should be adapted to signal to the receiver that encryption is taking place. The parameter "transport_scrambling_control_values" in the transport stream packet header may indicate whether an MPEG transport stream packet contains encrypted data. With regard to the "transport_scrambling_control" parameter, the association of the table in FIG. 12 may be used, for example.

5.5. Syntax of the Program Association Table PAT ("programm_association_section")

The program association table PAT, or the program association section, which may be represented, for example, by the data "data_byte" of a transport stream packet having the packet identifier PID=0x0000, will be briefly described below.

A syntax representation of the program association section "program_association_section( )" is shown in FIG. 13. The program association section includes a "table_ID" table identifier as well as a "section_syntax_indicator" syntax flag. Moreover, the program association section includes a "section_length" length indication. In addition, the program association section includes a "transport_stream_ID" transport stream identifier as well as a "version_number" version number indication. In addition, the program association section includes a "current_next_indicator" flag indicating whether the program association section is to be effective for current media contents or for media contents transmitted at a later point in time. In addition, the program association section includes a "section_number" section number indication as well as a "last_section_number" indication which designates a last section of a sequence of sections. The section numbers mentioned enable distributing a program association section across several packets.

In addition, the program association section includes a "program_number" program number identifier as well as a "program_map_PID" packet type identifier, which indicates a packet type of a transport stream packet including a program association table.

Finally, the program association section also includes a checksum "CRC_32".

6. RECEIVER BEHAVIOR

The behavior of a receiver receiving the transport stream explained above will be briefly described below. A DMB CA receiver, i.e. a receiver for digital multimedia broadcasting with access restriction, behaves as follows once a DMB data stream has been selected:

In a first step, the receiver waits for the program association table PAT. The latter may readily be recognized by the packet type identifier and/or the program identification PID in the MPEG transport stream header, for this packet type identifier may be 0 (or have a different predefined value). In this MPEG transport stream packet, it now recognizes—by means of the embedded access restriction descriptors in the "CA_ECM_section( )" and/or "CA_section( )" tables within the private data area "transport_private_data"—whether an access restriction CA is used and whether it supports the access restriction system (CA system) used. If this is the case, it may evaluate the access restriction descriptor of the method supported by it. Possibly the receiver may also wait for further PAT packets (or padding, or zero, packets) and/or for the "usual" access restriction packets, or CA packets, until it has collected all the useful information. Subsequently, one may recognize, with every other MPEG transport stream packet (i.e. packets having a packet type identifier PID≠0) by means of the values of the "transport_scrambling_control" information whether the packet is encrypted and which key may be used if need be.

A corresponding receiver behavior may be achieved, for example, at least partly by the transport stream analyzer 300 and/or by the DAB receiver 400.

7. ALTERNATIVE CONCEPTS

Several alternative concepts which are currently possible and relate to the fundamental structure of access restriction methods for digital multimedia broadcasting, DMB, will be described below.

7.1 Encryption in Accordance with Reference [6]

In order to realize access restriction, MPEG transport streams (e.g. MPEG2 transport stream packets of 188 bytes each) or entire MPEG4-encoded programs or program parts (such as elementary program streams PES) may be encrypted, for example. This encryption corresponds to the encryption used in DVB-T.

Figure 15:
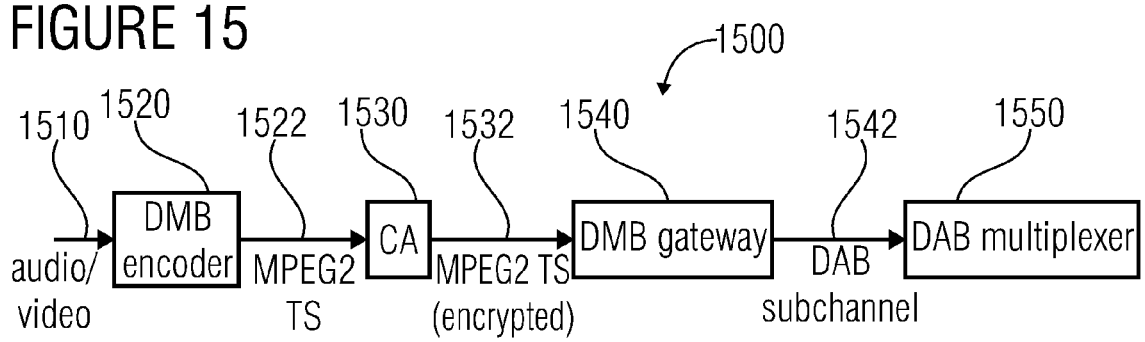
FIG. 15 shows a block diagram of a comparative DAB signal provider.

This encryption method will be briefly described below. FIG. 15 shows a block diagram of a signal provider. The signal provider 1500 of FIG. 15 includes a DMB encoder 1520 configured to receive media information, e.g. audio information and/or video information 1510, and to provide an MPEG2 transport stream 1522 on the basis thereof. An access restrictor, or access restriction adder, 1530 receives the MPEG2 transport stream 1522 and provides, on the basis thereof, an at least partly encrypted MPEG2 transport stream 1532. A DMB gateway 1540 receives the at least partly encrypted MPEG2 transport stream 1532 and provides a DAB subchannel signal 1542 on the basis thereof. A DAB multiplexer 1550 receives the DAB subchannel signal 1542 and provides the DAB signal on the basis thereof.

The DMB encoder 1520 describes the encoded program and its program element (e.g. audio and video) within the program mapping table PMT. In the case of an encrypted data stream, this signaling may also describe what it is that is being encrypted (entire program or only part of a program), and by using which methods. In addition, any access restriction information (e.g. ECM information) that may be used for the decryption may also be embedded into the MPEG2 transport stream data stream.

Either the DMB encoder 1520 inserts the useful signaling (even though it need not necessarily be already encrypting itself), or the access restriction module (CA module 1530) adapts the signaling information and adds the useful access restriction information. Since the data rate of a DAB subchannel 1542 is predefined, this means that the DMB encoder 1520 is not allowed not utilize the entire data rate of the subchannel, but leaves part of the data rate (i.e. a specific number of MPEG transport stream packets) unused, so that they are available to the access restriction module 1530. Transmission of one MPEG transport stream packet per second corresponds to a data rate of 1632 bits/s (including the additional error protection).

The method described above entails several disadvantages, however, which will be described below. Even though the DMB encoder 1520 does not need to perform any encryption itself, it may be able to leave at least a specific number of MPEG transport stream packets unused so that they are available for the transmission of the access restriction information (and of a program mapping table PMT which may possibly be extended by access restriction signaling).

This means a useful adaptation of these encoders 1520. An encoder which has been developed for unencrypted DMB may be modified so that encrypted DMB becomes possible.

7.2 Encryption of DAB Subchannels in Accordance with Reference [5]

Encryption of DAB subchannels, which is also briefly described as "DAB subchannel CA", will be described below.

A DAB subchannel is a channel of a fixed data rate. Every 24 ms, a DAB receiver receives a fixed number of bytes, referred to as DAB frames, for each DAB subchannel. The number of bytes depends on the (fixed) bitrate of the channel.

In the event of DAB subchannel access restriction (DAB subchannel CA), a DAB frame consists of two parts. The first part of the frame contains CA data (e.g. ECMs, EMMs), and the second, by far largest, part of the frame contains the encrypted payload data.

Figure 16A:
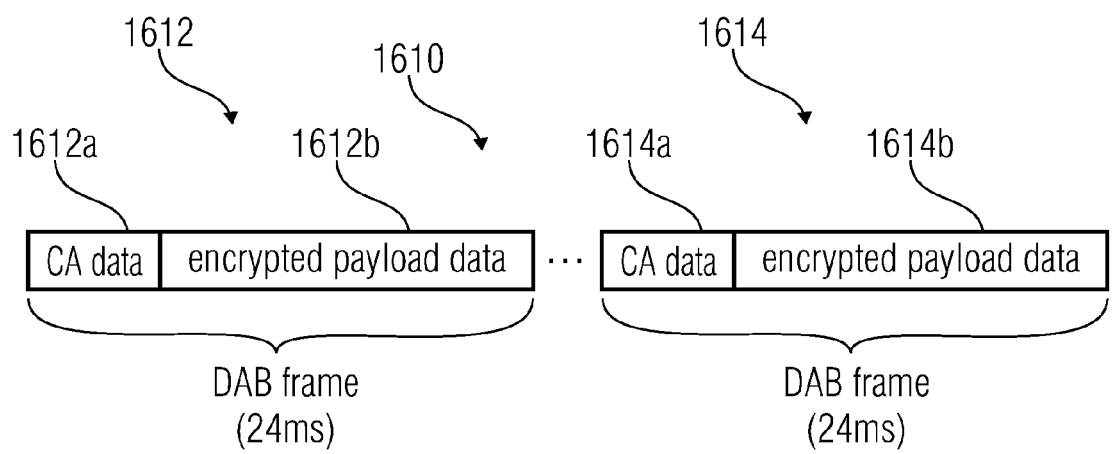
FIGS. 16A and 16B show a block diagram of a further comparative DAB signal provider.
Figure 16B:
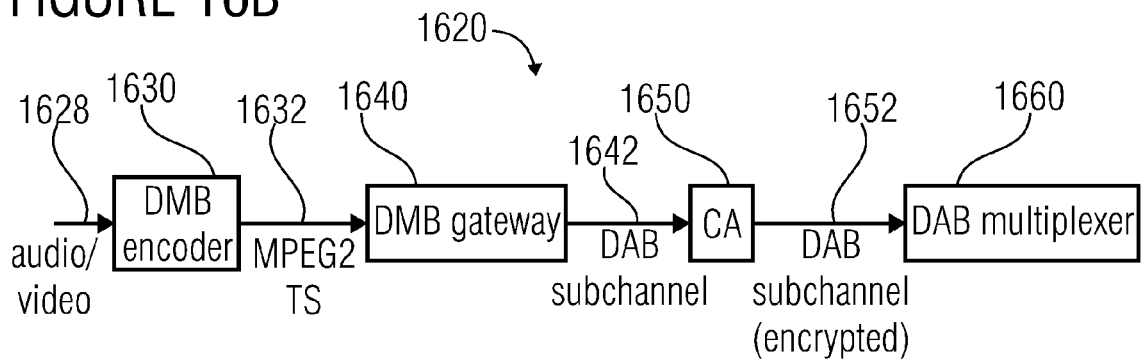

At reference numeral 1610, FIG. 16 shows the schematic representation of DAB frames having a length of, e.g., 24 ms. A first message is designated by 1612, and a second message is designated by 1614. The first message 1612 contains CA data 1612a and encrypted payload data 1612b. Similarly, the second message 1614 contains CA data 1614a and encrypted payload data 1614b.

At reference numeral 1620, FIG. 16 further shows a block diagram of a DAB signal provider which implements the corresponding concept. The DAB provider 1620 includes a DAB encoder 1630 configured to receive audio data and/or video data 1628 and to provide an MPEG2 transport stream 1632 on the basis thereof. The DAB signal provider 1620 further includes a DMB gateway 1640 configured to receive the MPEG2 transport stream 1632 and to provide a DAB subchannel 1642 on the basis thereof. In addition, the DAB signal provider 1620 includes an access entitlement adder 1650 configured to receive the DAB subchannel 1642 and to provide, on the basis thereof, an at least partly encrypted DAB subchannel 1652 which is supplied to a DAB multiplexer 1660 as an input signal. On the basis thereof, the DAB multiplexer 1660 provides the DAB signal.

The corresponding method will be briefly described in the following. In the method, the MPEG transport stream packets are initially embedded into DAB subchannels, and the resulting DAB frames (i.e. the bytes of the subchannel which are transmitted every 24 ms) are then encrypted. Subsequently, the CA module combines CA information and encrypted data and produces a DAB frame which is correspondingly larger (i.e. involves a higher bitrate) than that provided by the DMB gateway 1640. To this end, the useful CA information 1612a, 1614a is added at the beginning of each frame. The rest of the resulting frame contains the encrypted DMB data 1612b, 1614b (i.e. parts of the MPEG2 transport data stream).

For reasons inherent to their functional principle, with DAB subchannel CA, only complete encryption of a DMB program is possible. It is not possible, e.g., to encrypt only the audio (or the audio section) but to leave the video (or the video section) unencrypted.

Since DAB subchannels may be a multiple of 8 kbps, the overhead caused by the DAB subchannel CA is at least 8 kbps or a multiple of 8 kbps.

Several disadvantages of the method of the concept described above will be explained below. Initially it is to be stated that the encrypted DAB frame is split into two, the first part containing CA data 1612a, 1614a, and the second part containing the encrypted DMB data 1612b, 1614b. As is customary with MPEG transport streams, the DMB data is protected against transmission errors by an interleaver and a Reed-Solomon code. However, the type of encryption means that initially, the error protection is calculated, and that subsequently, the error-protected MPEG transport stream packets are encrypted. However, this also means that on the receive side, and encryption has to be performed first, whereupon error protection has to be employed. However, this contradicts the conventional setup of a receiver, wherein error protection is employed first and, subsequently, the error-corrected data is forwarded. Thus, the access restriction would have to be built in at very low protocol layers of the receiver.

The DMB data is additionally protected against transmission errors. It therefore seems recommendable to demand same for the CA information as well, for if said information is not received correctly, decrypting the DMB stream will not be possible. However, the DAB subchannel CA does not make any provisions for this. Therefore, this would yet have to be extended (on a proprietary basis).

Moreover, the DAB subchannel CA may use an overhead of at least 8 kbps, which is due to the granularity of a DAB subchannel.

7.3. Encrypting Access Units in Accordance with MPEG4 IPMP

MPEG4 IPMP offers end-to-end encryption, which is very reliable but has to be incorporated in the encoder and is therefore not suitable if an existing data stream is to be encrypted at a later point in time. Moreover, MPEG4 IPMP is not widely spread.

8. CONCLUSIONS

Embodiments in accordance with the invention enable keeping the overhead resulting from sending out the CA information to a minimum. This may be effected, on the one hand, by means of short CA information, but on the other hand by skilled embedding of the CA information.

The length of the CA information differs as a function of the CA system used. For skilled embedding of the CA information, a CA framework is defined in accordance with the invention. Said CA framework is independent of the CA system used. It defines
1. the transport level at which the encryption is to take place;
2. the manner in which an encryption is signaled; and
3. the place where the CA information (EMM and ECM) is to be embedded.

Pay TV utilizing DMB technology is a relatively new application. In contrast to DVB-T, which also uses MPEG2 transport streams, and to DAB, for DMB there is no defined framework for access restriction as yet. A description was given above as to why encryption by analogy with the access restriction framework for DVB-T and/or with the access restriction framework DAB is possible, but not ideal. An inventive access restriction framework specifically for DMB is described herein which meets the following requirements:
1. Definition of an access restriction framework applicable for any access restriction system and any encryption method.
2. Definition of the encryption levels and embedding of the access restriction information for DMB;
3. Definition of the signaling;
4. Bitrate-saving transmission of the CA information;
5. Transport of the content keys (ECMs) within the same channel as the content itself;
6. Transport of all EMMs within a separate "master channel" is possible;
7. Easy integrability into existing sending systems;
8. The description of the method is as simple as possible, i.e. it utilizes as many existing mechanisms as possible. A simple subset of the encryption types that are possible for DMB all in all (i.e., e.g., only one level at which encryption is performed, e.g. precisely only MPEG transport stream encryption) is found so as to keep the complexity of the receiver to a minimum.

Embodiments in accordance with the invention meet the requirements mentioned and therefore provide a particularly advantageous access restriction concept.

Several important aspects and advantages of the inventive concept will be summarized once again below.

In embodiments in accordance with the invention, CA information is embedded into existing, but hitherto unused data fields. In accordance with the invention, utilization of the "transport_private_data" field within the adaptation field "adaptation_field( )" within the transport stream packet header is proposed. A sufficient useful data rate is available, for example, within packets having a program association table (PAT packets). The CA information is embedded by analogy with embedding of PAD data in Reference [3] in the PAT. Possible encoding of said CA information is described above by way of example. Actual encryption is performed at the transport level, or transport stream level, or elementary program stream level (see Reference [6]). It is possible, for example, to send two audio streams, only one of which is encrypted.

Optionally, additional utilization of padding, or zero, packets or other MPEG transport stream packets having embedded CA information is possible.

Embodiments in accordance with the invention exhibit substantial advantages of the method as compared to other encryption methods. As compared to encryption within the MPEG transport stream packets, embodiments in accordance with the invention comprise one or more of the following advantages, for example:
  The data rate hitherto unused is used, i.e. no data rate needs to be provided for CA information;
  The DMB encoder may utilize the full data rate, and no overhead for CA information will arise (therefore, no MPEG transport stream packets are reserved for CA information); and
  Since the CA information are contained within the same MPEG transport stream packet as is the program association table PAT, they are very readily available during tuning, or channel change (tune-in). Therefore, an access restriction which corresponds to this proposal will not increase the tune-in time or channel switching time as compared to an unencrypted data stream.

As compared to encryption of DAB subchannels (also referred to as DAB subchannel CA), one or more of the following advantages result:

No overhead of at least 8 kbps;

The CA information is error-protected;

The entire subchannel is coded uniformly (all of this is MPEG transport stream), and there is no subdivision; and Encryption is performed prior to application of the error protection, which thus corresponds to the conventional layer model of the receiver.

In embodiments in accordance with the invention, the above-described "CA-Descriptor" data structure is embedded into the MPEG transport stream packet having the program association table PAT, and the actual encryption at the MPEG transport stream level is utilized. In accordance with the invention, data having low bitrate requirement, namely the CA information, are embedded into the MPEG transport stream packets having the program association table, which are transmitted regularly but are relatively empty.

Embedding of the CA information resembles or corresponds to the type of embedding that has already been used for PAD data in the DMB standard.

9. ALTERNATIVES OF IMPLEMENTATION

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by (or while using) a hardware device, such as a microprocessor, a programmable computer or an electronic circuit. In some embodiments, some or several of the most important method steps may be performed by such a device.

A signal encoded in accordance with the invention, for example an audio signal or a video signal or a transport stream signal or a DAB signal, may be stored on a digital storage medium or may be transmitted on a transmission medium such as a wireless transmission medium or a wired transmission medium, for example, e.g. the internet.

The audio signal encoded in accordance with the invention may be stored on a digital storage medium or may be transmitted on a transmission medium such as a wireless transmission medium or a wired transmission medium, for example, e.g. the internet.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually do cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

10. REFERENCES

[1] ETSI, ETR 289 (1996-10), Digital Video Broadcasting (DVB); Support for use of scrambling and Conditional Access (CA) within digital broadcast systems

[2] ETSI TS 102 428 v1.1.1 (2005-06): "Digital Audio Broadcasting (DAB); DMB video services; User application specification", 06/2005.

[3] ETSI TS 102 428 v1.2.1 (2009-06): "Digital Audio Broadcasting (DAB); DMB video services; User application specification", 06/2009.

[4] ETSI EN 300 401 V1.4.1 (2006-06): "Digital Audio Broadcasting (DAB) to mobile, portable and fixed receivers, 06/2006

[5] ETSI TS 102 367 V1.2.1 (2006-01): "Digital Audio Broadcasting (DAB); Conditional access), 01/2006

[6] ITU-T H.222.0 (2006-05): "Series H: Audiovisual and multimedia system, Infrastructure of audiovisual services—Transmission multiplexing and synchronization", "Information technology—Generic coding of moving pictures and associated audio information: Systems"

11. LEGEND

| | |
|---|---|
| elementary_PID | elementary PID |
| DMB Encoder | DMB encoder |
| TS packet | transport stream packet |
| MPEG_transport_stream | MPEG transport stream |
| do | do |
| transport_packet | transport packet |
| while | while |
| nextbits | next bits |
| sync_byte | synchronization byte |
| program_number | program number |
| program_map_PID | program map PID |
| Object Descriptor | object descriptor |
| ES_Descriptor | ES descriptor |
| stream Type | stream type |
| specific Info | specific information |
| Image | image |
| Audio | audio |
| SD-Stream | SD stream |
| OD Stream | OD stream |
| program_stream_info_length | program stream information length |
| 1st_descriptor_loop | first descriptor loop |
| IOD-Descriptor | IOD descriptor |
| stream_type | stream type |
| elementary PID | elementary PID |
| 2nd_descriptor_loop | second descriptor loop |
| SL_Descriptor | SL descriptor |
| PES-packet | PES packet |
| adaptation_field_control | adaptation field control |
| adaptation_field | adaptation field |
| transport_private_data_flag | transport private data flag |
| transport_private_data_length | transport private data length |
| program_association_section | program association section |
| sync_byte | sync byte |
| transport_error_indicator | transport error indicator |
| Payload_unit_start_indicator | payload unit start indicator |
| transport_priority | transport priority |
| transport_scrambling_control | transport scrambling control |
| adaptation_field_control | adaptation field control |
| continuity_counter | continuity counter |
| if | if |
| adaptation_field | adaptation field |
| data_byte | data byte |
| adaptation_field_length | adaptation field length |
| discontinuity_indicator | discontinuity indicator |
| random_access_indicator | random access indicator |
| elementary_stream_priority_indicator | elementary stream priority indicator |
| PCR-Flag | PCR flag |
| OPCR_flag | OPCR flag |
| splicing_point_flag | splicing point flag |
| transport_private_data_flag | transport private data flag |
| adaptation_field_extension_flag | adaptation field extension flag |
| program_clock_reference_base reserved | program clock reference base reserved |
| program_clock_reference_extension | program clock reference extension |
| splice_countdown | splice countdown |
| transport_private_data_length | transport private data length |
| for | for |
| Private_data_byte | private data byte |
| stuffing_byte | stuffing byte |
| CA_section | CA section |
| table_id | table id |
| section_syntax_indicator | section syntax indicator |
| reserved | reserved |
| section_length | section length |
| version_number | version number |
| current_next_indicator | current next indicator |
| section_number | section number |
| last_section_number | last section number |
| descriptor | descriptor |
| CA_descriptor | CA descriptor |
| descriptor_tag | descriptor tag |
| descriptor_length | descriptor length |
| CA_system_ID | CA system ID |
| private_data_byte | private data byte |
| CA_ECM_section | CA ECM section |
| CA_data | CA data |
| CA_info_lenth | CA info lenth |
| proprietary_CA_Information | proprietary CA information |
| programm_association_section | programm association section |
| transport_stream_id | transport stream id |
| version_number | version number |
| current_next_indicator | current next indicator |
| section_number | section number |
| last_section_number | last section number |
| program_number | program number |
| network_PID | network PID |
| program_map_PID | program map PID |

The invention claimed is:

1. An apparatus for providing a plurality of transport stream packets describing digital media information, comprising:
an input mechanism configured to receive an input signal that includes digital media information;
an output mechanism for outputting a transport stream; and
a hardware device connected between the input mechanism and the output mechanism, wherein the hardware device is configured or programmed to perform a method comprising:
receiving the input digital media information from the input mechanism,
producing the transport stream based on the received input digital media information, wherein the produced transport stream includes
a transport stream packet of a first packet type comprising a program association table and access restriction information comprising key information for decrypting encrypted media information, the program association table comprising an association between a program No. and a packet type identifier of a further transport stream packet of a second packet type, and
a transport stream packet of the second packet type such that the transport stream packet of the second packet type comprises a reference to packet type identifiers of transport stream payload data packets which describe contents of different content types of the digital media information; and
outputting the produced transport stream through the output mechanism.

2. The apparatus of claim 1, wherein the method further comprises:
providing transport stream packets comprising the first packet type and comprising both the program association table and the access restriction information comprising the key information,
to provide transport stream packets comprising the second packet type, and to provide transport stream payload data packets comprising a third packet type which differs from the first packet type and the second packet type; and providing the transport stream packets comprising the first packet type, the transport stream packets comprising the second packet type, and the transport stream packets comprising the third packet type in such a manner that the transport stream packets comprising the first packet type, the transport stream packets comprising the second packet type, and the transport stream packets comprising the third packet type all comprise the same predefined packet length so as to achieve a transport stream comprising transport stream packets of identical lengths.

3. The apparatus of claim 1, wherein the method further comprises:

adding the access restriction information in an additional information field of the transport stream packet of the first packet type; and signaling a presence of the additional information field by means of a flag.

4. The apparatus of claim 1, wherein the method further comprises:

providing the transport stream packets in such a manner that each of the transport stream packets comprises, at a predefined position of a transport stream packet preamble, a packet type identifier identifying a packet type of the respective transport stream packet; and providing the transport stream packets such that a transport stream packet comprising the program association table and the access restriction information comprises a reference to a packet type identifier of a transport stream packet comprising a program mapping table comprising packet type identifiers for one or more types of data streams, without the transport stream packet, which comprises the program association table and the access restriction information, itself describing the payload content of the digital media information.

5. The apparatus of claim 1, wherein the method further comprises:

providing the transport stream packet comprising the program association table and the access restriction information in such a manner that the transport stream packet comprising the program association table and the access restriction information comprises a sequence of sections of different access restriction information, one of the sections comprising an entitlement management message or a reference to an entitlement management message, and another one of the sections comprising an entitlement key message or a reference to an entitlement key message; and each of the sections of the access restriction information comprising a table identifier describing the type of the access restriction information comprised within the section, and length information describing a length of the information comprised within the section.

6. The apparatus of claim 1, wherein the method further comprises:

adding content key information for decrypting encrypted media information exclusively into transport stream packets comprising a program association table, so that transport stream packets which describe the content of the digital media information in the form of encoded audio information or in the form of encoded image information or in the form of encoded video information are free from content key information for decrypting the encrypted media information.

7. The apparatus of claim 1, wherein the method further comprises:

providing the transport stream in such a manner that the transport stream comprises a reference to a separate channel within which entitlement management messages are transmitted.

8. The apparatus of claim 1, wherein the method further comprises:

adding the access restriction information in a private data area of a transport stream packet in accordance with ETSI TS 102 428, which comprises the program association table in accordance with ISO-IEC 13818-1.

9. The apparatus of claim 1, wherein the method further comprises:

providing, within a transport stream, transport stream packets comprising a program association table and access restriction information at least once per second.

10. The apparatus of claim 1, wherein the method further comprises:

occupying less than 30% of a transport stream packet comprising a program association table and access restriction information by the program association table.

11. A digital audio broadcasting (DAB) signal provider for providing a DAB signal comprising access-restricted media information, comprising:

a transport stream provider for providing a plurality of transport stream packets describing digital media information, wherein the transport stream provider includes an input mechanism configured to receive an input signal that includes digital media information, an output mechanism for outputting an MPEG2 transport stream, and a hardware device connected between the input mechanism and the output mechanism; and a DAB services combiner, wherein the DAB services combiner is configured to receive the MPEG2 transport stream from the transport stream provider, receive one or more other DAB services, combine the MPEG2 transport stream with the one or more other DAB services so as to acquire the DAB signal, and output the DAB signal;

wherein the hardware device is configured or programmed to perform a method comprising:

providing a transport stream packet of a first packet type comprising a program association table and access restriction information comprising key information for decrypting encrypted media information, the program association table comprising an association between a program No. and a packet type identifier of a further transport stream packet of a second packet type; and providing a transport stream packet of the second packet type such that the transport stream packet of the second packet type comprises a reference to packet type identifiers of transport stream payload data packets which describe contents of different content types of the digital media information, providing transport stream packets of a first packet type which comprise a program association table and access restriction information, providing a transport stream packet of the second packet type in such a manner that the transport stream packet of the second packet type comprises a reference to packet type identifiers of transport stream payload data packets, providing transport stream payload data packets of a third packet type which describe a content of a first media type of the access-restricted media information, and providing transport stream payload data packets of a fourth packet type which describe a content of a second media type of the access-restricted media information, a content of at least some of the transport stream payload data packets of the third packet type being encrypted, or a content of at least some of the transport stream payload data packets of the fourth packet type being encrypted, the transport stream packets of the first packet type, the transport stream packets of the second packet type, the transport stream packets of the third packet type, and the transport stream packets of the fourth packet type being part of the MPEG2 transport stream, and the access restriction information comprised within the transport stream packets of the first packet type comprising content key information for decrypting the encrypted contents of the transport stream packets of the third packet type or the encrypted contents of the transport stream packets of the fourth packet type.

12. A method of providing a plurality of transport stream packets describing digital media information, the method comprising:

providing a transport stream packet of a first packet type comprising a program association table and access restriction information comprising key information for decrypting encrypted media information, the program association table comprising an association between a program No. and a packet type identifier of a further transport stream packet of a second packet type; and providing a transport stream packet of the second packet type such that the transport stream packet of the second packet type comprises a reference to packet type identifiers of transport stream payload data packets which describe contents of different content types of the digital media information;

wherein the method is performed using a hardware apparatus, or using a computer, or using a combination of a hardware apparatus and a computer.

13. A non-transitory computer-readable medium, comprising a computer program for performing a method of providing a plurality of transport stream packets describing digital media information, the method comprising:

providing a transport stream packet of a first packet type comprising a program association table and access restriction information comprising key information for decrypting encrypted media information, the program association table comprising an association between a program No. and a packet type identifier of a further transport stream packet of a second packet type; and providing a transport stream packet of the second packet type such that the transport stream packet of the second packet type comprises a reference to packet type identifiers of transport stream payload data packets which describe contents of different content types of the digital media information, when the computer program runs on a computer.

14. A non-transitory computer-readable storage medium, comprising a transport stream signal comprising:

a transport stream packet of a first packet type comprising a program association table and access restriction information comprising key information for decrypting encrypted media information, the program association table comprising an association between a program No. and a packet type identifier of a further transport stream packet of a second packet type; and a transport stream packet of the second packet type, the transport stream packet of the second packet type comprising a reference to packet type identifiers of transport stream payload data packets which describe contents of different content types of the digital media information.

\* \* \* \* \*